United States Patent [19]

Wallace et al.

[11] Patent Number: 5,313,568
[45] Date of Patent: May 17, 1994

[54] THREE DIMENSIONAL COMPUTER GRAPHICS EMPLOYING RAY TRACING TO COMPUTE FORM FACTORS IN RADIOSITY

[75] Inventors: John R. Wallace, Ithaca; Kells A. Elmquist, Lansing; Eric A. Haines, Ithaca, all of N.Y.

[73] Assignee: Hewlett-Packard Company, Palo Alto, Calif.

[21] Appl. No.: 88,392

[22] Filed: Jul. 6, 1993

Related U.S. Application Data

[63] Continuation of Ser. No. 531,377, May 31, 1990, abandoned.

[51] Int. Cl.$^5$ ............................................. G06F 15/72
[52] U.S. Cl. ..................................... 395/126; 395/120; 395/123
[58] Field of Search ............... 395/126, 120, 123, 121, 395/127; 340/729, 728

[56] References Cited

U.S. PATENT DOCUMENTS

| | | | |
|---|---|---|---|
| 3,602,702 | 8/1971 | Warnock | 395/121 |
| 4,625,289 | 11/1986 | Rockwood | 395/122 |
| 4,649,498 | 3/1987 | Kedem et al. | 395/120 |
| 4,709,231 | 11/1987 | Sakaibara et al. | 395/126 X |
| 4,807,158 | 2/1989 | Blanton et al. | 395/125 |
| 4,866,637 | 9/1989 | Gonzalez-Lopez et al. | 395/126 |
| 4,912,659 | 3/1990 | Liang | 395/126 X |
| 4,928,250 | 5/1990 | Greenberg et al. | 395/126 |
| 5,058,042 | 10/1991 | Hanna et al. | 395/127 |
| 5,083,287 | 1/1992 | Obata et al. | 395/126 |
| 5,239,624 | 8/1993 | Cook et al. | 395/126 X |

FOREIGN PATENT DOCUMENTS 0144924 6/1985 European Pat. Off. .

OTHER PUBLICATIONS

Brock et al., "A Unified Interactive Geometric Modeler for Simulating Highly Complex Environments", Cornell University Program of Computer Graphics, (1986), pp. 316-329.
Whitted, "An Improved Illumination Model for Shaded Display", *Communications of the ACM*, vol. 23, No. 6, pp. 343-349 (Jun. 1980).
Whitted, "Processing Requirements for Hidden Surface Elimination and Realistic Shading", *IEEE*, pp. 245-250 (Feb. 25, 1982).
Malley, Thomas J. V., "A Shading Method for Computer Generated Images", *Thesis submitted to the faculty of the University of Utah*, Dept. of Computer Science, Mar., 1988.
Arvo, James, "Backward Ray Tracing", *Apollo Computer, Inc.*, pp. 1-7, Chelmsford, MA, Aug., 1986.
Greenberg, Donald P. et al., "Radiosity: A Method for Computing Global Illumination", *The Visual Computer*, No. 2, pp. 291-297, 1986.

(List continued on next page.)

Primary Examiner—Raymond J. Bayerl
Attorney, Agent, or Firm—Guy J. Kelley

[57] ABSTRACT

A method for rendering a three-dimensional image on a computer graphics display device involving the steps of providing a data base defining at least the geometry and reflectivity of light emitters and object in the scene and approximating surfaces of each object in the scene as patches in three dimensional space. Each patch is approximated as one or more elements defined by vertices. A source of irradiated light in the scene is selected and defined as a light source. Then, for each vertex, a form factor representing the fraction of light energy that arrives at the vertex from the source is determined by ray tracing from the vertex to the source. Radiosity is then determined at each vertex based on the form factors determined for each vertex. This process is repeated a selected number of times using a different light source each time. In this manner a plurality of radiosities are determined that collectively indicate the global illumination of the scene. The scene is then displayed based upon these radiosities.

25 Claims, 10 Drawing Sheets

OTHER PUBLICATIONS

Meyer, Gary W. et al., "An Experimental Evaluation of Computer Graphics Imagery", *ACM Transactions on Graphics*, vol. 5, No. 1, pp. 30–50, Jan., 1986.

Haines, Eric A. et al., "The Light Buffer: A Shadow-Testing Accelerator" *IEEE CG & A*, pp. 6–16, Sep. 1986.

Barlow, Andrew, "The Quest for Realism in Computer Modeling", *Computer Graphics Review*, pp. 22–29, Feb., 1989.

Fujimoto, Akira, "Turbo Beam Tracing-A Physically Accurate Lighting Simulation Environment", *Knowledge Based Image Computing Systems*, pp. 1–5, May 20, 1988.

Maxwell, Gregory M. et al., "Calculations of the Radiation Configuration Factor Using Ray Casting", *Computer Aided Design*, vol. 18, No. 7, pp. 371–379, Sep., 1986.

Cook, Robert L. et al., "Distributed Ray Tracing", *Computer Graphics*, vol. 18, No. 3, pp. 137–145, Jul., 1984.

Chattopadhyay, Sudeb et al., "Bi-Directional Ray Tracing", *Computer Graphics* 1987, Proceedings of CG International '87, pp. 335–343.

Cohen, Michael F. et al., "An Efficient Radiosity Approach For Realistic Image Synthesis", *IEEE CG & A*, pp. 26–35, Mar., 1986.

Cohen, Michael F. et al., "A Progressive Refinement Approach to Fast Radiosity Image Generation", *Computer Graphics*, vol. 22, No. 4, pp. 75–84, Aug., 1988.

Baum, Daniel R. et al., "The Back-Buffer Algorithm: An Extension of the Radiosity Method to Dynamic Environments", *The Visual Computer*, No. 2, pp. 298–306, 1986.

Cohen, Michael F. et al., "The Hemi-Cube A Radiosity Solution For Complex Environments", *Computer Graphics*, vol. 19, No. 3, pp. 31–40, Jul., 1985.

Goral, Cindy M. et al., "Modeling the Interaction of Light Between Diffuse Surfaces", *Computer Graphics*, vol. 18, No. 3, pp. 213–222, Jul., 1984.

Immel, David S. et al., "A Radiosity Method For Non-Diffuse Environments", *ACM (Siggraph '86 Proceedings)*, vol. 20, No. 4, pp. 133–142, Aug. 18–22, 1986.

Greenberg, Donald P., "Coons Award Lecture", *Communications of the ACM*, vol. 31, No. 2, pp. 123–129, Feb., 1988.

McLeod, Jonah, "HP Delivers Photo Realism on an Interactive System", *Electronics*, pp. 95–97, Mar. 17, 1988.

FIG. 10
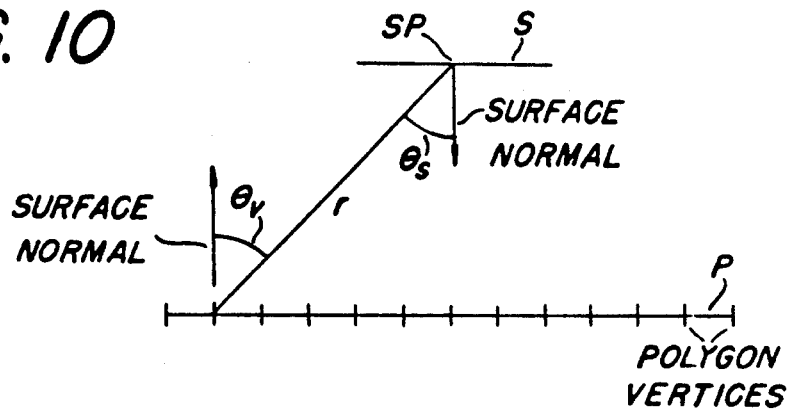
FIG. 11
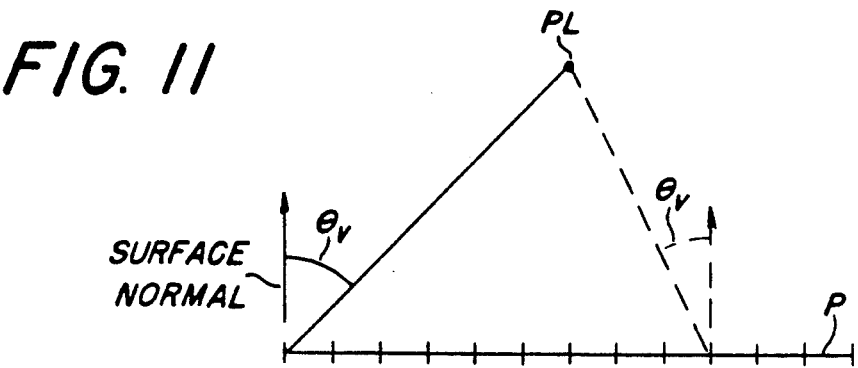
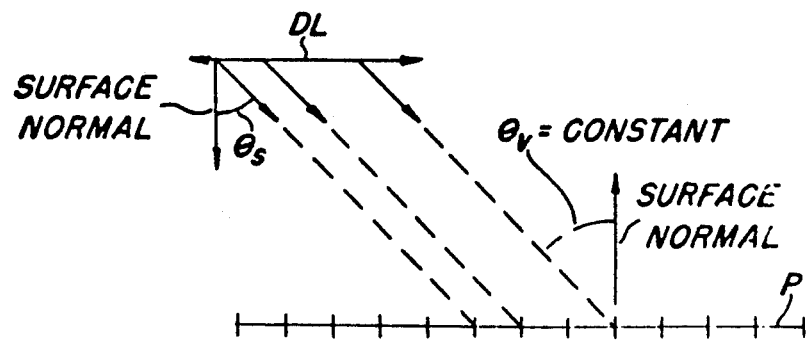
FIG. 12

THREE DIMENSIONAL COMPUTER GRAPHICS EMPLOYING RAY TRACING TO COMPUTE FORM FACTORS IN RADIOSITY

CROSS REFERENCE TO RELATED APPLICATION(S)

This is a continuation of copending application Ser. No. 07/531,377 filed on May 31, 1990, now abandoned.

FIELD OF THE INVENTION

The present invention relates generally to the field of three dimensional computer graphics. More particularly, the present invention relates to a global illumination technique for generating three dimensional computer graphics employing ray tracing to compute form factors in radiosity.

BACKGROUND OF THE INVENTION

The synthesis of realistic images in three dimensional computer graphics requires the evaluation of a shading model simulating the propagation of light within a scene or environment. In the prior art, local shading models have been employed wherein shading is computed based only on direct illumination by light sources. Synthesis of realistic shading, and hence of realistic images, however, requires the use of a global illumination model in which secondary illumination provided by light reflected from other sources in the scene, and the shadowing of one surface by another, are taken into account.

A number of global illumination techniques for generating three dimensional computer graphics are known, the most common of which are ray tracing and radiosity. The following publications, which are incorporated herein by reference, are illustrative: Goral, Cindy M. et al., "Modeling the Interaction of Light Between Diffuse Surfaces", *Computer Graphics*, vol. 18, no. 3, pp. 213-222 (July, 1984); Cohen, Michael F. et al., "The Hemi-Cube: A Radiosity Solution For Complex Environments", *SIGGRAPH Proceedings*, vol. 19, no. 3, pp. 31-40 (1985); Greenberg, Donald P. et al. "Radiosity: A Method For Computing Global Illumination", *The Visual Computer*, vol. 2, pp. 291-297 (1986); Cohen, Michael F. et al., "An Efficient Radiosity Approach For Realistic Image Synthesis", *IEEE CG&A*, pp. 26-35 (March, 1986); Cohen, Michael F. et al., "A Progressive Refinement Approach to Fast Radiosity Image Generation", *Computer Graphics*, vol. 22, no. 4, pp. 75-84 (August, 1988). See also the following publications, incorporated herein by reference, which describe various ray tracing techniques: Maxwell, Gregory M. et al., "Calculation of the Radiation Configuration Using Ray Casting", *Computer Aided Design*, vol. 18, no. 7, pp. 371-379 (September 1986); Arvo, James, "Backward Ray Tracing", Apollo Computer, Inc. Chelmsfor, Mass. (date unknown); Cook, Robert L. et al., "Distributed Ray Tracing", *Computer Graphics*, vol. 18, no. 3, pp. 137-145 (July, 1984); Chattopadhyay, Sudeb et al., "Bi-Directional Ray Tracing", *Proceedings of Computer Graphics* 1987, pp. 335-343 (1987).

Ray tracing approximates the global illumination of a scene by tracing rays from the eye through a viewing plane and into the three dimensional environment. For each ray, the closest surface intersection point is determined. Depending upon the material properties of the surface, it may spawn reflected and refracted rays, which are recursively traced in the same fashion. As the spawned rays are propagated through the environment, a tree of intersection locations is constructed for each sample point on the viewing plane. The final image intensity of this point is determined by traversing the tree and computing the contribution of each node according to a shading model.

The intensity calculation for each node consists of two parts. The first part determines if the intersection point can be seen from each light source. If no opaque object blocks the light from the intersection point, then the second part consists of using the attributes of the surface and the light source to calculate the contribution to the final color intensity of the pixel.

The first operation, called "shadow testing", is normally the most computationally expensive process of the ray tracing technique. The reason for this is that each object in the entire environment must be tested to determine if it occludes each light source for every ray intersection point. For scenes with complex lighting schemes, the percentage of time required for occlusion testing can increase to over 80% of the total computation time.

Thus, ray tracing techniques can be slow and in any event suffer from the disadvantage that they are view dependent, i.e., the scene must be recreated for each new view.

The advantage of the radiosity technique is that it is view independent. The radiosity technique consists of a series of independent steps. First, the geometry, surface color and surface reflectance properties of the object in the scene are specified and stored in a data base. Each surface is subdivided into a number of discrete surface patches for which a constant intensity or radiosity is assumed. The geometric relationship between each patch and the environment to every other patch is next determined, resulting in a system of simultaneous equations. Solving these equations yields the radiosity for each patch. Finally, the radiosity information is used to render an image of the environment from any given view point.

Calculating the geometry relationships, or form factors, between patches is the most computationally expensive part of the radiosity technique for complex environments (i.e., environments where some patches may fully or partially occlude others). Thus, despite the advantage of view independence, the radiosity technique has been considered impractical for scenes of high complexity; the time and storage costs of the algorithm were expensive (i.e., $O(n^2)$, where n is the number of surfaces in the scene).

Another rendering technique is known as progressive radiosity. Progressive radiosity is a refinement upon the basic radiosity technique and provides good synthetic images early in the solution process. In the progressive radiosity technique, illumination is computed one step at a time. At each step, the reflected or emitted illumination provided by a single source is distributed to all other surfaces. The determination of where the illumination falls in the scene is accomplished using the well known "hemi-cube" algorithm, (see, e.g., the above referenced Cohen et al. publication relating to the hemi-cube), in which the scene is scan converted from the point of view of the surface providing the illumination. In effect, light is "shot out" from the source in a predefined uniform set of directions to land where it may in the environment. Although the overall progressive radiosity technique provides improvements over prior radiosity techniques for graphics, the use of the hemi-cube algorithm to determine illumination suffers inherently from aliasing and undersampling, particularly as the scene complexity increases.

The present invention employs an improvement to the progressive radiosity technique and, therefore, additional detail respecting the underlying physics and mathematics of the progressive radiosity technique is provided herein as background.

As mentioned, the original radiosity technique determines diffuse global illumination by solving a system of equations expressing the dependence of the energy leaving each surface and that arriving from every other surface. The energy leaving a surface is determined according to the following relationship:

$$B_i A_i = E_i A_i + P_i \sum_{j=1}^{n} B_j A_j F_{ji}$$

where
- $B_i$ = radiosity of surface i (energy per unit area)
- $A_i$ = area of surface i
- $E_i$ = emitted energy per unit area
- $P_i$ = reflectivity of surface i
- $B_j$ = radiosity of surface j
- $A_j$ = area of surface j
- $F_{ji}$ = form-factor from surface j to surface i The form-factor, $F_{ji}$, is the fraction of energy leaving surface j that arrives at a second surface i.

An equation of this form exists for every surface in the scene. The resulting system of simultaneous equations can be solved using conventional matrix techniques to determine the surface radiosities. A known shading calculation then uses these surface radiosities to determine the radiosity at the vertices of smaller polygonal elements into which the surfaces have been subdivided. (The elements are actually defined by vertices of the polygons.) Following the radiosity solution, Gouraud interpolation based on the element vertex radiosities can be used to render smoothly shaded images.

Forming the matrix prior to the solution requires determining and saving the form factor between each surface and every other surface, a process that is expensive ($O(n^2)$) both in time and memory requirements. The progressive radiosity technique overcomes this difficulty by solving the radiosity equations in a series of steps. The solution proceeds as follows:

do [the following steps] until the image is converged:
1. select the surface with the greatest reflected and/or emitted energy (i.e., the surface having the greatest irradiated light energy);
2. compute the form-factors from that surface to all surface elements; and,
3. add the resulting contribution to the radiosity of each element.

In the prior art, the form-factors from the source surface to the receiving elements are computed using the well known hemi-cube technique, in which all elements are projected, scan converted and z-buffered onto the five faces of a hemi-cube positioned at the source surface. In the early steps, the surfaces chosen will be the light emitters since other surfaces will have, as yet, received very little illumination. Subsequent steps will select secondary sources, starting with those surfaces that received the most light directly from the light sources, and so on.

Since each solution step updates the radiosity of all surfaces, an increasingly accurate result can be displayed following each step. An ambient term derived from the known energy yet to be distributed can be added to improve the image. Useful images can thus be produced very early in the solution process. There are, however, inherent problems in using a hemi-cube placed at the source surface to determine form factors. These are discussed below.

The source of efficiency in the progressive radiosity algorithm is that illumination is computed roughly in the order that light propagates through the environment. In effect, the path of light is followed from the light emitters into the scene.

The more common strategy for computer graphics, however, is to start at the eye and trace the light back to the source. This has the advantage of restricting shading effort to those points in the scene that appear in the image and to the directions that reach the eye. Ray tracing and its derivatives, distributed ray tracing and path tracing, employ this approach. However, these methods do not have information about where in the scene to look for important sources of light, other than the light emitters themselves. Hence, for a diffuse surface, much sampling may be expended on directions from which little energy turns out to arrive.

By reversing the process and following the propagation of energy from the emitters, progressive radiosity continually has information about where the energy arrives from. Attention can thus be focused on the most important surfaces of illumination. Even very small secondary sources that nonetheless happen to reflect a great deal of light will be detected, a very difficult case when working entirely from the eye by ray tracing.

The foremost difficulty with the hemi-cube approach employed in progressive radiosity is uneven and inadequate sampling. A surface that is fairly large in the image may, when viewed from the light source, be small enough to fall between the hemi-cube pixels. Such a surface will receive no illumination. FIG. 1 illustrates this problem. FIG. 1 illustrates a portion of a scene having surfaces A, B and C and a source S over which a hemi-cube H has been superimposed. As shown, the hemi-cube is divided into pixels PI. Surfaces A, B and C are all substantially the same size. Surface A covers two hemi-cube pixels (rays R1 and R2) while surface B covers only pixel (ray R4). Surface C drops out entirely and therefore incorrectly receives no illumination. In addition, since the hemi-cube is a uniform sampling method, it will produce aliasing. The shading of a fine grid of small polygons (defined by the vertices) will show a distinct plaid pattern if the polygons are small enough to alias on the hemi-cube. FIG. 2 schematically illustrates this phenomenon in two dimensions. As shown in FIG. 2, a surface patch P consisting of a grid of polygons (defined by the polygon or "element" vertices) is illuminated by a small light source S. The rectangular hemi-cube sampling pattern interacts with the regular receiving grid of polygons to generate aliasing. Increasing the resolution of the hemi-cube to reduce these effects becomes expensive in terms of both computation time and storage, and, in any case, can never guarantee adequate sampling for all polygons.

There are additional problems with the progressive radiosity technique that employs the hemi-cube approach. First, in the radiosity method, light sources are normally surfaces with area. Performing a single hemi-cube at a surface is equivalent to treating the surface as a point source. To approximate an area source, hemi-cubes must be performed at several points on the surface. However, the number of points necessary for a good approximation depends upon how close the area is to the surface it illuminates. Employing the hemi-cube approach, the number of points representing the source area will be the same for all receiving surfaces, since all surfaces are projected onto each hemi-cube.

A further serious limitation derives from the fact that a hemi-cube placed over the light source determines the energy received by source areas (the elements), not points on the surface. Since it is actually the shading at element vertices that is used in rendering the final image, the radiosity at each vertex must be determined by averaging the radiosity of the elements surrounding it. This requires connectivity information that is not always available. Similarly, smooth shading of curved surfaces which are approximated by independent polygonal facets also requires connectivity information when the hemi-cube is used. Continuity of shading across such surfaces is normally ensured by calculating shading at the facet vertices using the true surface normal, as in Gouraud shading. Using the hemi-cube approach, radiosities can be determined directly only for each facet and averaging must be performed to obtain vertex shading.

It is therefore desirable to provide a method of rendering a three-dimensional, computer generated, graphics image that attains the benefits of both progressive radiosity and ray tracing, but avoids the problems inherent in employing the hemi-cube approach. It is also desirable to provide a method for generating a three dimensional image that is less costly in terms of computational time and storage than the conventional progressive radiosity technique. The present invention achieves these objectives.

BRIEF DESCRIPTION OF THE DRAWINGS

FIGS. 10, 11 and 12 conceptually illustrate light sources that may be implemented in the practice of the present invention.

SUMMARY OF THE INVENTION

Figure 1:
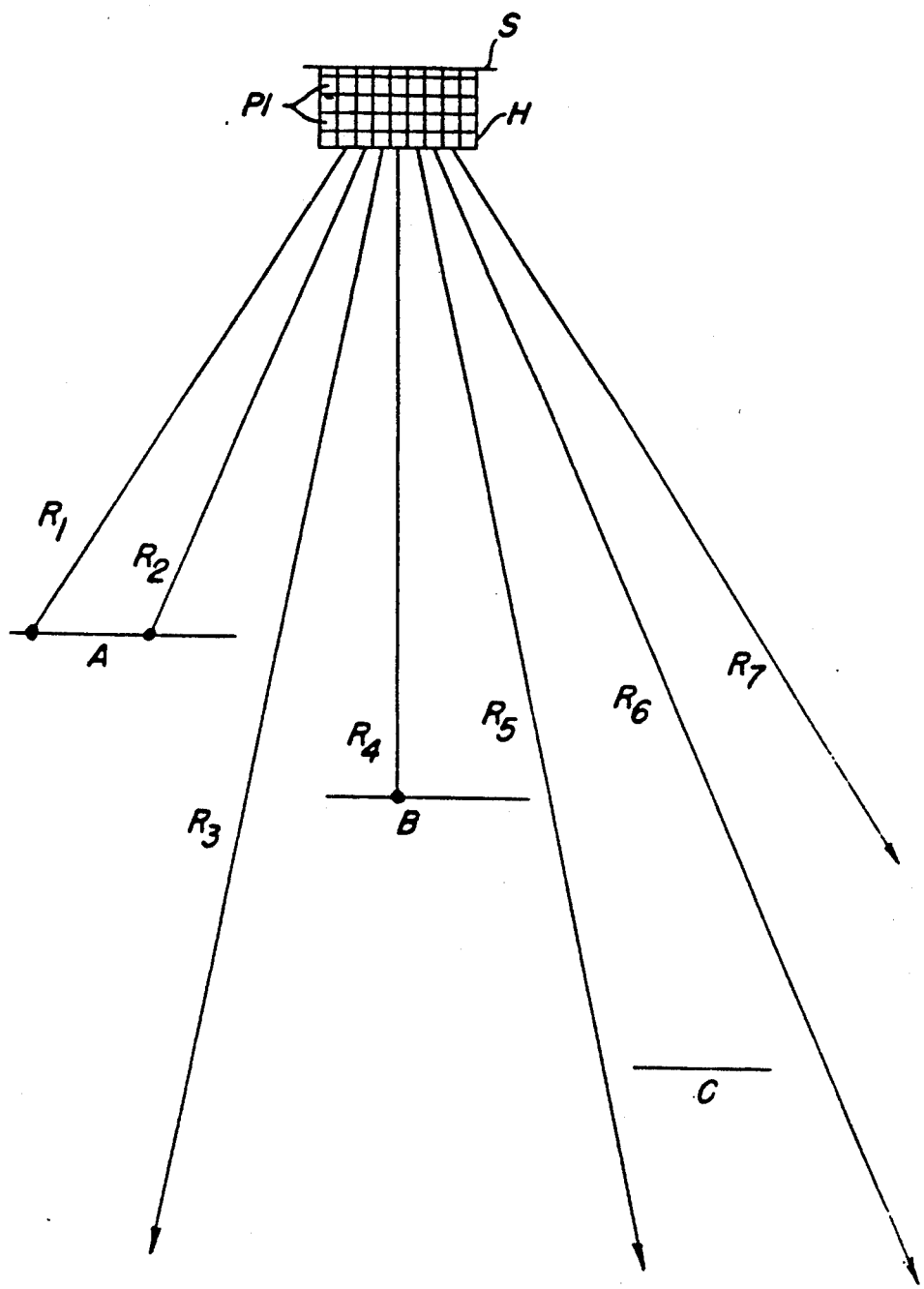
FIG. 1 schematically illustrates a problem with a prior art global illumination technique.
Figure 2:
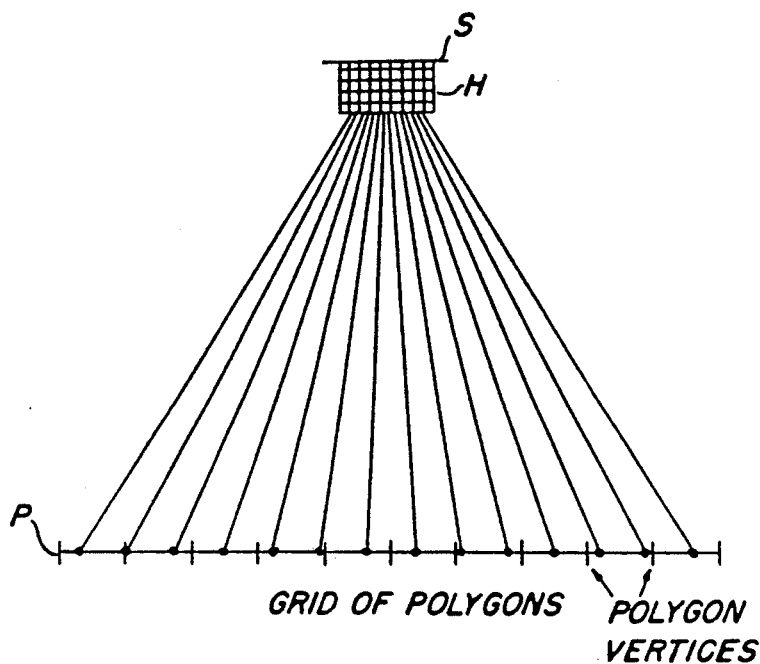
FIG. 2 schematically illustrates another problem with the same prior art global illumination technique.

A method of rendering a three dimensional scene according to the invention comprises the steps of providing a database defining light emitters and objects in the scene, and approximating surfaces of each object in the scene as patches in three dimensional space, wherein each patch is subdivided into one or more elements defined by vertices. A source of irradiated light energy, which can comprise a source of emitted and/or reflected light, is selected and defined as a light source. Thus, the light source can comprise either an actual light emitter or a surface in the scene that reflects a high amount of light energy, or both.

According to the invention, form factors from the light source to each vertex are determined by ray tracing, then radiosity at each vertex are determined by employing these form factors in the basic radiosity equation set forth above. After the radiosity of each patch due to the selected light source has been obtained, a new light source in the scene is selected and the process of determining form factors by ray tracing from that light source to each vertex and determining new radiosities is repeated. The result is a plurality of radiosities collectively indicating global illumination of the scene that can be employed to display the three dimensional scene in well known manner.

According to the invention, the light source can be a point or a surface having an area, defined as a source surface. In the case of source surfaces, form factors are determined from at least one sample point, and preferably from a plurality of sample points, on the source surface to each vertex, and the number of sample points on the source surface from which the form factor is determined is independently selected from vertex to vertex. Stated otherwise, for a particular vertex, a ray is cast (i.e., by ray tracing) from the vertex to each sample point on the source surface, and the number of rays cast from each vertex is independent of the number of rays cast from any other vertex. Occlusion between the source surface and a vertex by an object in the scene in determined with respect to each vertex by casting rays from the vertex to the sample points on the source surface. A test for intersection of any of the rays with the object is performed, and the form factor for the source surface to the vertex is determined based upon the number of intersecting and nonintersecting ray cast from the vertex to the source surface. The form factor for an intersecting ray is defined as having zero magnitude, whereas the magnitude of other form factors will vary depending upon such characteristics as vertex and source orientation, and the form factor equation employed. A total form factor for the source surface to each vertex is determined by summing the values of the form factors for each ray cast from the vertex to each sample point on the source surface and dividing the result by the total number of rays cast from the vertex.

A significant advantage flowing from the practice of the present invention is the ability to define light sources in radiosity that have artificial (and arbitrary) characteristics. For example, so called "non-physical" light sources with no attenuation over distance or light having arbitrary quadratic attenuation can be simulated. Further, light sources such as "point lights" (i.e., a light emitter that has no area) and "positional lights" (e.g., spot lights and cone lights) having artificial light distribution patterns, as well as so called "directional lights" (i.e., parallel light rays located an infinite distance from the scene) can be simulated in radiosity. In the practice of the invention, these features are achieved by redefining the form factor equation for the desired effect.

DETAILED DESCRIPTION OF THE INVENTION

The following definitions are employed herein for convenience, though their meaning and significance is well known in the art.

Surface: A bounded area with a constant or continuous surface normal, for example, polygons and curved surfaces. Surfaces are not limited by complexity, and may be concave polygons with holes.

Patch: A whole or part of a surface which has been divided through some number of binary subdivisions. It is the basic geometric unit which acts as an illuminator of the environment, whether direct (light) or indirect (reflector). Reflectivity and emission characteristics are assumed constant over the patch. Global illumination is solved in terms of patch radiosities.

Element: Whole or part of a patch which has been divided through some number of binary subdivisions. It is the smallest geometric unit for which the environment intensities are computed. It acts as a receiver of light for patches and as a discrete unit for numerical integration of the patch to patch form factors. An element is usually a polygon, but may assume other shapes.

Vertices: Points having X, Y and Z coordinates defining the elements.

Figure 3:
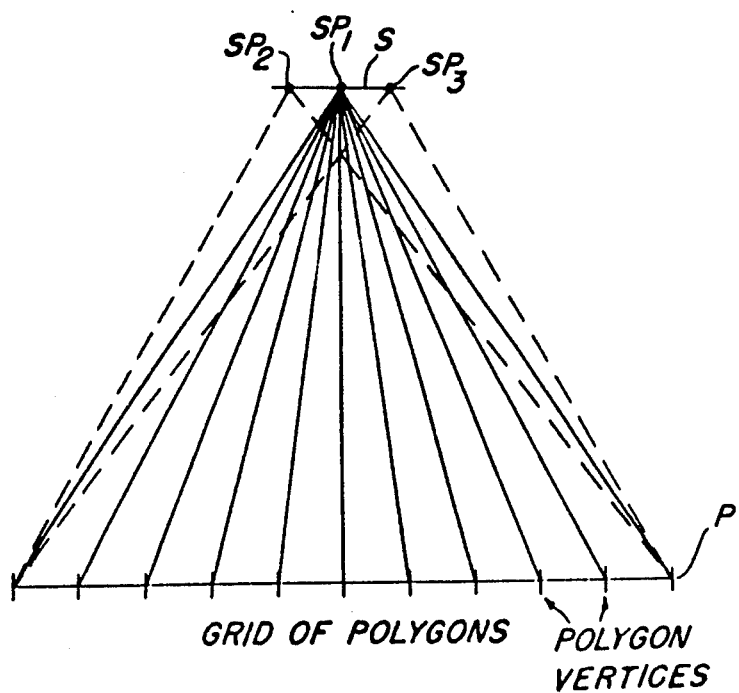
FIG. 3 schematically illustrates the ray tracing technique for computing form factors in accordance with the practice of the present invention.

According to the present invention, the aforementioned problems with the prior art method of progressive radiosity employing the hemi-cube approach may be eliminated by determining the illumination directly at the vertices. As before, at each solution step, the surface with the most radiated and/or emitted energy to contribute to the environment is treated as the source surface. Instead of performing a hemi-cube at the source, each element vertex in the scene is then visited and a form factor is computed form the source surface to the vertex by casting rays (i.e., by ray tracing) from the vertex to sample points on the source. This process is sometimes referred to as "shooting rays." This process eliminates sampling problems inherent in the hemi-cube approach since illumination is guaranteed to be computed at every vertex. This is schematically illustrated in FIG. 3 wherein rays from a source S are cast to each of the vertices defining the surface elements or polygons of a patch P. As illustrated in FIG. 3, a plurality of sample points $SP_1$, $Sp_2$ and $SP_3$, are defined on the area of the source and are uniformly distributed thereon. The number of sample points on the source S may vary from one vertex to the next, thus allowing area sources to be approximated as accurately as desired. Since the form factors are computed independently at each vertex, each form factor may be computed to any desired accuracy. The true surface normal at the vertex may be used, thus solving the problem of continuous shading of independent surface facets.

Figure 4:
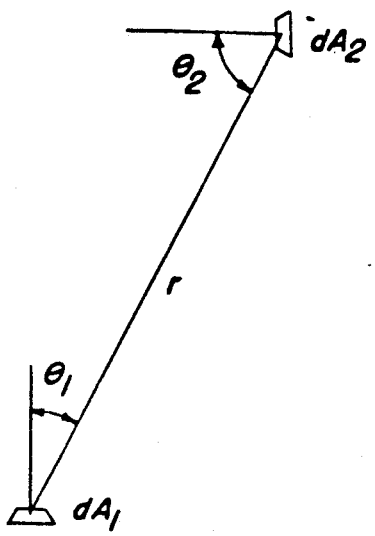
FIGS. 4, 5, 6 and 7 conceptually illustrate form factor computation according to the practice of the present invention.

FIG. 4 conceptually illustrates the concept of a form factor from a differential area $dA_1$ to a differential area $dA_2$, wherein the differential areas are separated by a distance r. As illustrated in FIG. 4, the ray cast between the two differential areas subtends an angle $\theta_1$ to the surface normal of differential area $dA_1$ and subtends an angle $\theta_2$ to the surface normal of the differential area $dA_2$. The form factor from differential area $dA_1$ to differential area $dA_2$ is:

$$dF_{12} = \frac{\cos\theta_1 \cos\theta_2}{\pi r^2} dA_2$$

Figure 5:
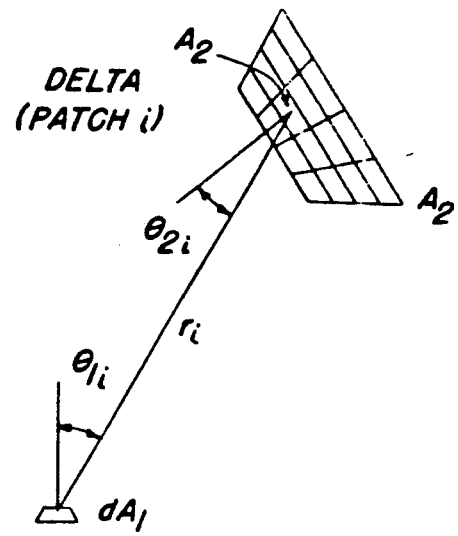

For a finite area $A_2$, this equation must be integrated over that area and can be solved analytically for simple configurations, but, for computer usage, it must be evaluated numerically. Numerical integration may be accomplished in straightforward manner by approximately the integral as the sum of form factors computed for smaller regions of areas "delta $A_2$" (each corresponding to a patch i). This is conceptually illustrated in FIG. 5 where the subscript "i" has been added to the terms r, $\theta$ and $\theta_2$ to indicate that form factors to a number "n" of patches i are to be determined. With reference to FIG. 5, the form factor from the differential area $dA_1$ to the finite area $A_2$ can be shown to be:

$$F_{12} = \sum_{i=1}^{n} \frac{\cos\theta_{1i} \cos\theta_{2i}}{\pi r_i^2} \text{ delta } A_2$$

A problem with the foregoing equation is that it breaks down if the size of delta $A_2$ is large relative to the distance r; thus as r becomes less than unity, the size of delta $A_2$ must be shrunk correspondingly, or the resulting form factor grows without bound.

Figure 6:
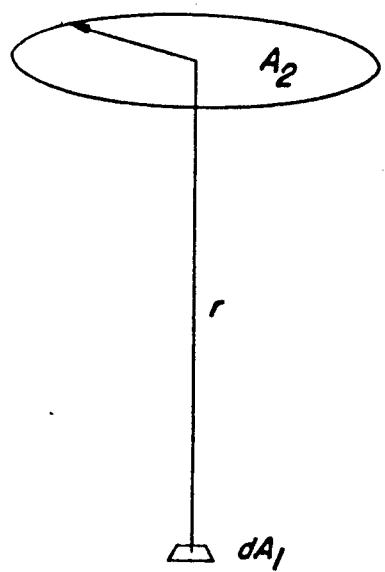

To limit the subdivision of the source area $A_2$, and thus the computational cost of computing form factors while avoiding the difficulty of the preceding equation, the delta areas (delta $A_2$ or patches i) are explicitly treated as finite areas. An equation for the form factor from finite delta areas (patches i) can be obtained by approximating each delta area by a simple finite geometry for which an analytical solution is available. For simplicity, a disk has been chosen as the finite area upon which to base the approximation. With reference to FIG. 6, the form factor $dF_{21}$, from a source area $A_2$ to a directly opposing, parallel differential area $dA_1$ is provided by the following relationship:

$$dF_{21} = dA_1/(\pi r^2 + A_2)$$

Figure 7:
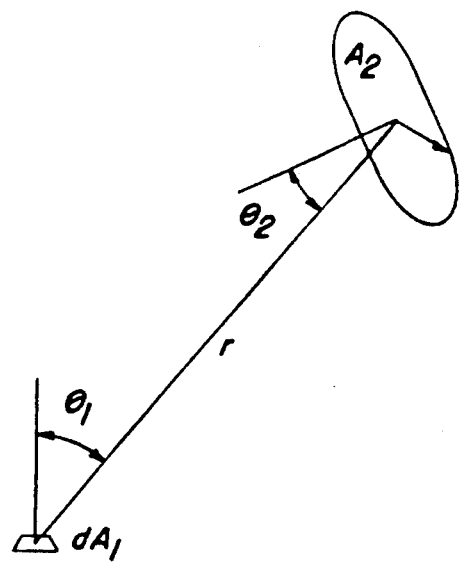

FIG. 7 illustrates the case where the source area $A_2$ and the differential area $dA_1$ are not in parallel planes. For this case, the form factor from the area $A_2$ (source surface) to the differential area $dA_1$ (receiving area) is approximated as:

$$dF_{21} = dA_1 \cos\theta_1 \cos\theta_2/(\pi r_2 + A_2)$$

As in the case of FIG. 5, to evaluate the form factor from a general source $A_2$ to a vertex at the receiving area $dA_1$, the source $A_2$ is divided into delta areas or patches. The form factor due to each patch is computed utilizing the immediately preceding equation. Occlusion between the source surface and the vertex by an object in the scene is tested by applying ray tracing methods, i.e., by "shooting" or "casting" a single ray from the receiving vertex to the center of the patch on the source. This ray is a simple shadow ray, in other words, it provides only a yes or no answer to the question of whether anything is intersected. For a yes answer, the magnitude of the form factor is zero. For a no answer, the magnitude of the form factor is computed according to the form factor equation. In the remaining discussion herein, this process of "shooting" rays to determined whether anything is intersected will be referred to as "sampling the source" and rays will be said to be "shot" from the vertex to sample points on the source. If sample points are distributed uniformly on the source, then the total form factor is simply the sum of the form factors computed for each sample point i according to the following relationship:

$$dF_{21} = \frac{1}{n} \sum_{i=1}^{n} \delta_i \frac{\cos\theta_{1i} \cos\theta_{2i}}{\pi r^2 + A_2/n}$$

where n = number of sample points on source $\delta_i$ = 1 if sample point is visible to vertex, 0 if occluded.

In the immediately preceding equation, the presence of the area term, $A_2$, in the denominator prevents the result from growing without bound for small values of r. This allows approximate form factors to be computed using large delta areas or patches, and hence a low number of sample points. Thus, a fast, approximate radiosity solution can be obtained using a very small number of rays (as few as one ray per vertex per source). The accuracy of the result increases as the number of sample points on the source is increased. This can be seen by observing that as the value of n grows larger, the term $A_2/n$ tends towards zero and each term of the summation approaches the equation for a form factor from a differential area to a differential, as in the case of the equation for FIG. 4. Thus, a smooth continuum of results is available depending upon the computational time that one is willing to expend on the executing computer system.

It can be shown that the radiosity of patch i due to energy received from another patch j (i.e., patch j being a source) can be determined according to the following relationship:

$$B_i A_i = P_i B_j A_j F_{ji}$$

where:
- $B_i$ = radiosity of patch i;
- $A_i$ = area of patch i;
- $P_i$ = reflectivity of patch i;
- $B_j$ = radiosity of patch j;
- $A_j$ = area of patch j; and,
- $F_{ji}$ = form factor from patch j to patch i.

If the radiosities are computed at vertices, instead of at the center of a patch, it can be shown that, by combining the form factor equation with the above radiosity equation, the equation for radiosity at a vertex 1 due to illumination by a source surface 2 is:

$$B_1 = P_1 B_2 A_2 \frac{1}{n} \sum_{i=1}^{n} \delta_i \frac{\cos\theta_{1i} \cos\theta_{2i}}{\pi r^2 + A_2/n}$$

where:
- $B_1$ = radiosity at the vertex 1;
- $P_1$ = reflectivity at vertex 1;
- $B_2$ = radiosity at source surface 2;
- $A_2$ = area of source surface 2;
- n = the number of sample points defined on the source surface (2);
- i represents one of the n sample points on the source surface (2) (for i=1 to n);
- $\delta_i$ = 1 if the sample point i is not occluded at vertex 1 and zero if occluded;
- $\theta_{1i}$ = is the angle between a surface normal of the source surface 2 and the ray cast from the sample point i to the vertex 1;
- $\theta_{2i}$ = is the angle between the surface normal of the patch at the vertex 1 and the ray cast from the sample point i to the vertex 1;
- r = is the distance between the vertex 1 and the sample point i.

At each step of the progressive solution, the contribution to the radiosity of each element vertex in the environment due to the current source is computed using this relationship.

It was previously mentioned that a uniform distribution of sample points on the source is used. However, it has been found that this can produce a form of aliasing, particularly at shadow edges. There are a number of solutions to this problem. The vertex radiosities can be filtered using a weighted averaged of neighboring vertex radiosities. Alternatively, the accuracy of form factors can be increased by shooting a variable number of rays for each vertex-source pair. The form factor for a given vertex-source pair can be computed using successively greater numbers of rays, until the variation and the resulting form factors drops below a certain criteria. Thus, at vertices lying on shadow boundaries, many rays may be shot to achieve an accurate form factor, while vertices completely inside or outside the shadow will require a much smaller number. This approach also increases the accuracy of form factors for sources that are very close to the vertex, in which case a large number of sample points may also be required.

Figure 8A:
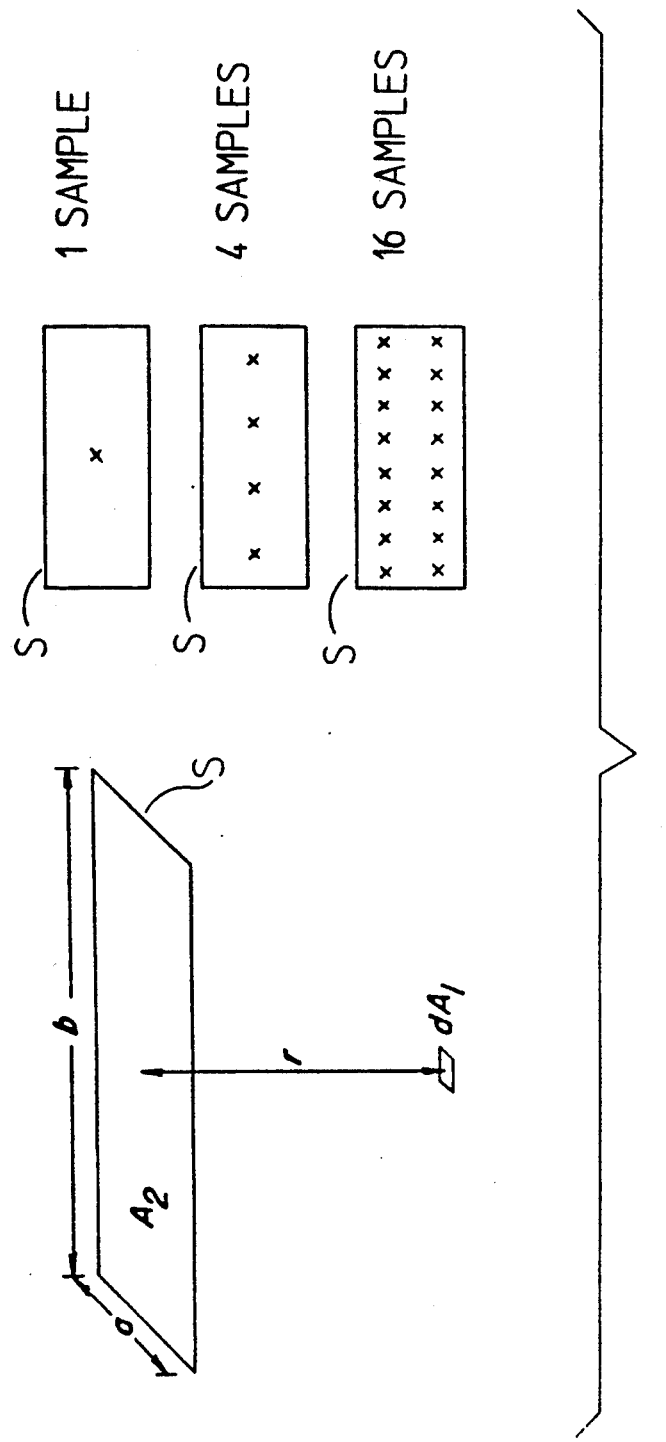
FIGS. 8A, 8B and 9A, 9B illustrate actual performance of the present invention against an analytical model.
Figure 8B:
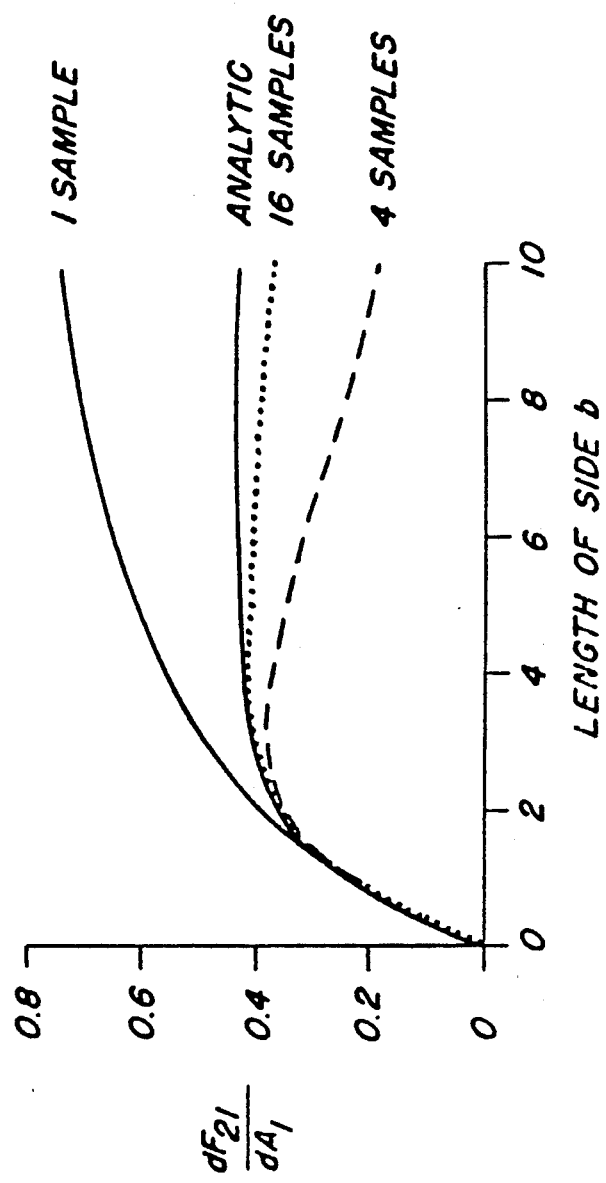
Figure 9A:
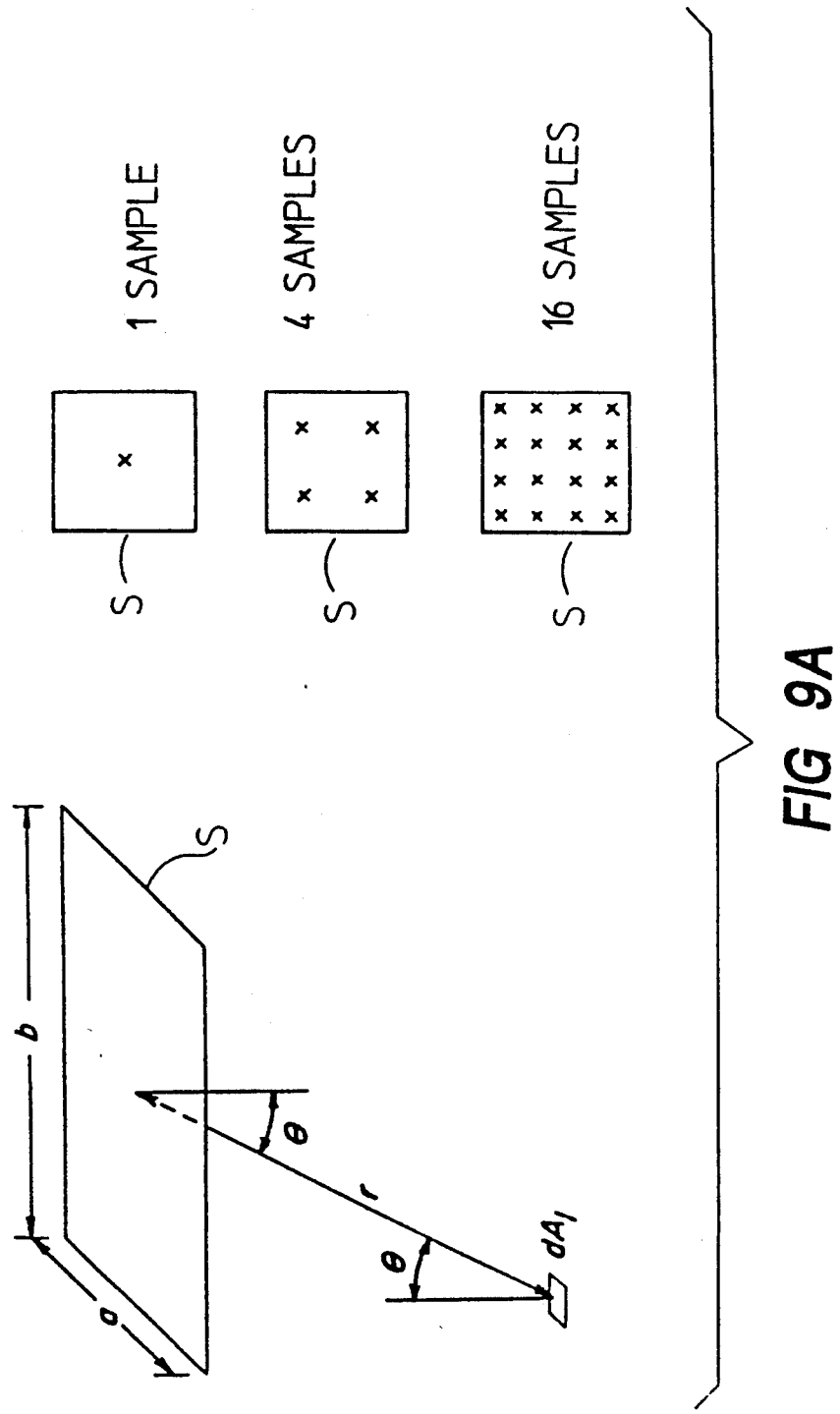
Figure 9B:
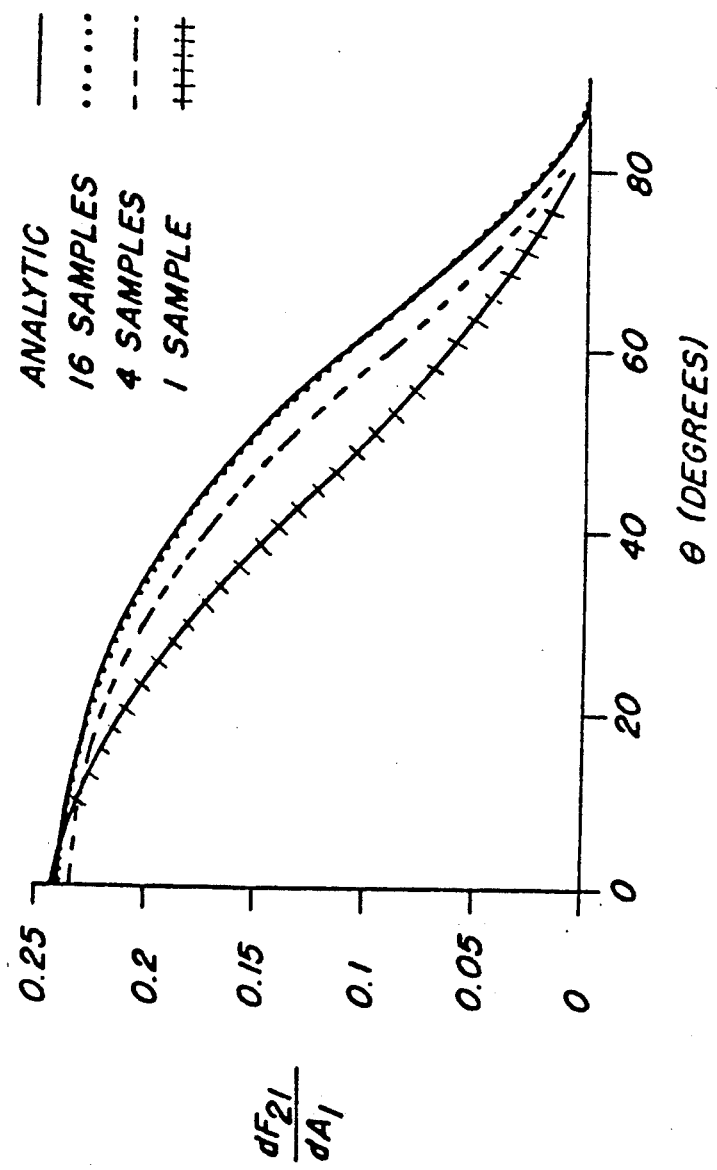

Form factors obtained using ray tracing from a vertex to an area source are compared to analytical results for several configurations in FIGS. 8A, 8B and 9A, 9B. As can be seen, the actual and analytical results are quite close for a square source, as illustrated in FIGS. 9A and 9B. Accuracy decreases as the source becomes more oblong, as illustrated in FIGS. 8A and 8B. The results also becomes less accurate as the source and vertex move off axis from one another, as illustrated in FIGS. 9A and 9B. However, since the magnitude of the form factors decreases at the same time, relative error is greatest at angles where incoming energy will make the smallest contribution. In each case, increasing the number of sample points brings the approximate result closer to the correct result.

The use of ray tracing to compute form factors in radiosity allows the geometry used for shadow testing to be different from that used to represent objects for shading and rendering. When shooting a ray, it is not necessary to test for intersection against all the elements into which the environment has been subdivided. The original surface geometries can be used instead. However, for shadow testing during the form factor computation, the ray tracer intersects the original, true surface geometries. The ability to use different geometric representations for shadow testing and for shading and rendering provides an important source of efficiency for radiosity. Adequately representing complex shadows can require subdividing surfaces into a very large number of small elements. By ray tracing against the original geometries, surfaces can be represented by as many facets as desired for shading and display, without increasing the cost of each shadow test.

The following is a pseudo-code listing setting forth the method of the present invention. The listing includes self-evident explanatory comments.

At a given step of the radiosity solution, a single surface patch is selected to act as the source surface. The contribution of the energy reflected or emitted by that patch to the radiosity of every element vertex in the environment is determined based on the form-factor from the source to the vertex. The form-factor for a source patch to a vertex is determined as follows:

```
current_ff_estimate = 0.0 (ff = form factor)
do (
  previous_ff_estimate = current_ff_estimate
  for several different points on the light source (
    determine direction from vertex to point on light source
    if vertex and light source face each other for this point (
      shoot ray from vertex to point
      if ray does not intersect anything between vertex and light (
```

```
                -continued
        label point on light as visible
        )
      )
    )
    current_ff_estimate = 0.0
    for each point on light (
      if point was labeled as visible (
        current_ff_estimate =
```

$$\text{current\_ff\_estimate} = \frac{\cos(\text{theta\_v})\cos(\text{theta\_s})}{\text{pi distance}**2 + \text{Area} / \text{num\_points}}$$

```
      )
    )
  ) until absolute value of current_ff_estimate
    minus previous_ff_estimate is
    less than some accuracy criterion
  form_factor = current_ff_estimate
  The following terms used above are defined here:
    Area = area of source patch
    theta_v = angle between vertex normal
      and direction to point on light
    theta_s = angle between source normal
      and direction to the vertex
    num_points = total number of points to
      which rays have been shot on the
      light source patch for this vertex
Point lights and directional lights use the same basic algorithm,
  except that the equation for the form-factor is different,
  and only one ray needs to be shot (since the light
  source has no area)
    determine direction from vertex to light
    if vertex is within cone of influence of the light (
      shoot ray from vertex to light source
      (for directional light, shoot ray in direction of light
source)
      if ray does not intersect anything between vertex and light (
```

$$\text{form\_factor} = \frac{\cos(\text{theta\_v}) \, [\cos(\text{theta\_s})]n}{a1 + a2 \text{ distance} + a3 \text{ distance } 2}$$

```
      )
    )
The equation given here for the form_factor
is a general equation that encompasses the most widely used
"non-physical" light source types. These are
explained in more detail below. Cone lights are taken
into account by the step in which the vertex is checked for
inclusion in the "cone of influence" of the light.
a1, a2 and a3 are the attenuation coefficients.
n is a spot light power.
```

**means to the power of, e.g. distance
**2 means distance squared.

Figure 13A:
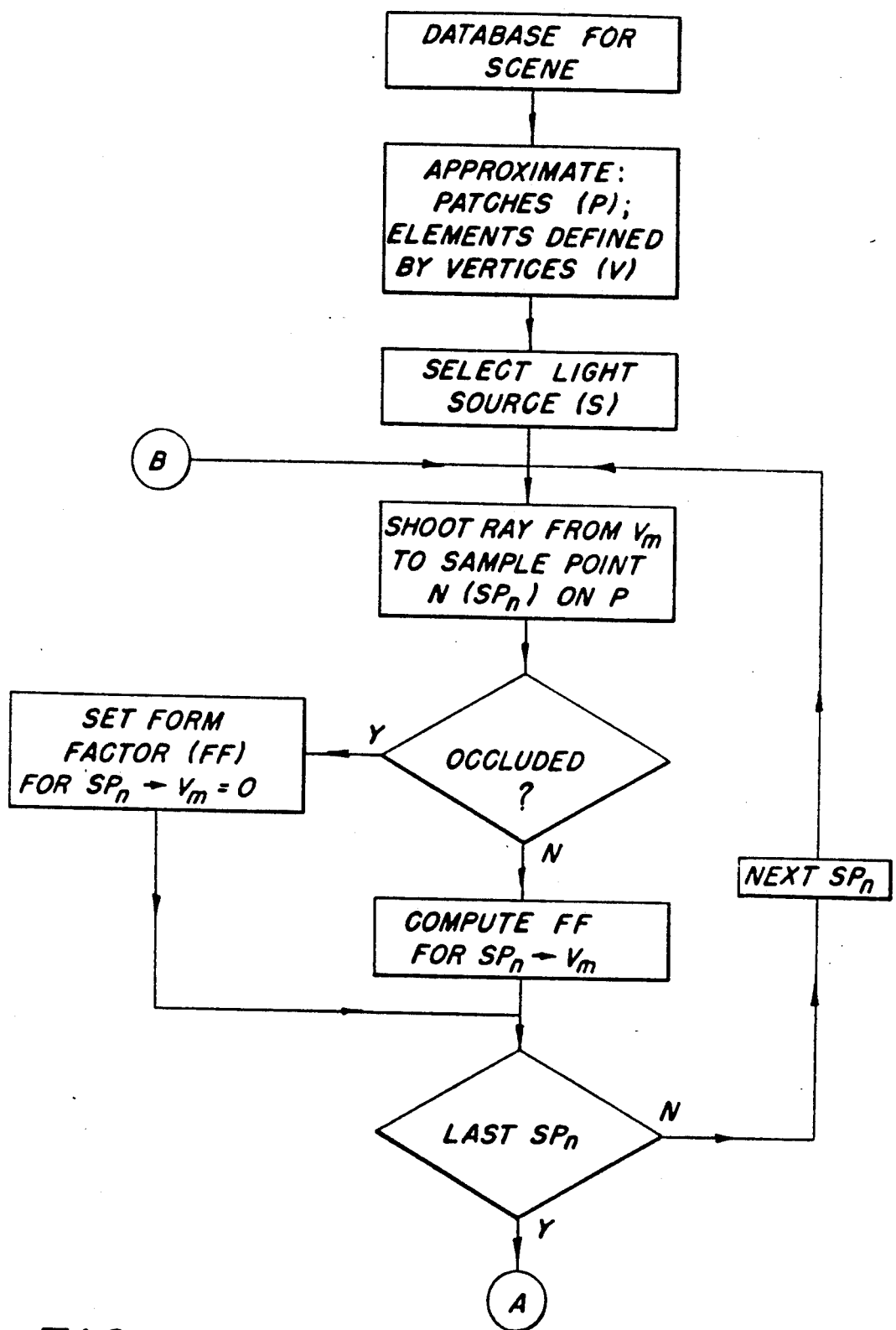
FIGS. 13A, B are a flow chart generally setting forth the method of the present invention.
Figure 13B:
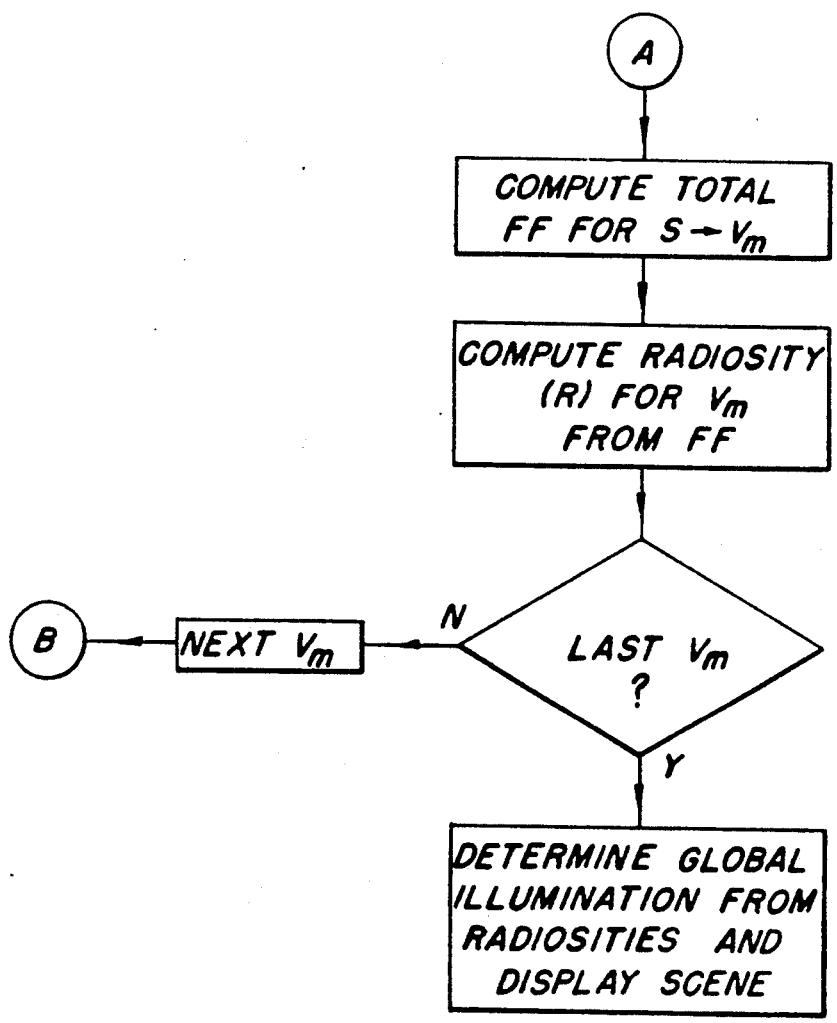

FIGS. 13A, B illustrate, in flow chart form, the method of the present invention described above and set forth in the pseudo code listing.

The present invention may be employed in connection with any suitable three dimensional graphics software, such as the commercially available Starbase Graphics software package and HPUX hardware manufactured and sold by Hewlett-Packard Company, Palo Alto, Calif. Attached hereto as Appendix A is a source code listing, written in the programming language "C", implementing the method of the present invention on such system. The implementation is for a three dimensional rendering of an object floating in the space of a room.

As pointed out in the pseudo code listing above, an important feature of the present invention is the ability to employ so called "non-physical" light sources in radiosity. A "non-physical" light source is one which has no physical counterpart outside of the computer. The ability to employ such light sources can be helpful in creating certain shading effects that help to define special relationships, surface geometries, etc. of the same scene.

According to the invention, different light sources including "non-physical" light sources are modeled by varying the form factor equation. This follows since light energy received at a point from a source is determined according to the selected form factor equation. Thus, by varying the form factor equation from point to point, variations in light characteristics, such as attenuation, distribution, etc., can be simulated.

As set forth in the pseudo code listing and with reference to FIG. 10, the basic equation for defining characteristics of light source according to the present invention is:

$$F = \frac{\cos\theta_v \, (\cos\theta_s)^n}{a_1 + a_2 r + a_3 r^2}$$

where:
F = form factor;
$\theta_v$, $\theta_s$ and r are as show in FIG. 10;
n = a distribution characteristic of the light source; and,
$a_1$, $a_2$, and $a_3$ = constants representing attenuation behavior of emitted light, i.e., the attenuation coefficients.

Thus, light having arbitrary quadratic attenuation can be simulated by arbitrarily selecting values of the constants $a_1$, $a_2$ and $a_3$. Alternatively, $a_1$ can be set to unity and $a_2$ and $a_3$ can be set to zero, in which case the preceding equation becomes:

$$F = \cos\theta_v (\cos\theta_s)^n$$

thus defining a light source that emits non-attenuating light.

FIG. 11 illustrates the case of a "point light" PL. By definition, a "point light" has no area and therefore the term $(\cos\theta_s)^n$ becomes unity, and the form factor from the point light PL to any vertex on a surface becomes:

$$F = \cos\theta_v.$$

FIG. 12 illustrates the case of a "directional light" DL. In the case of a directional light, all emitted rays are parallel and the term $\cos\theta_s$ is ignored (treated as unity) and thus the form factor employed in connection with a directional light becomes:

$$F = \cos\theta_v.$$

where $\theta_v$ gives the angle between the surface normal at the vertex and the light source direction.

"Positional lights" e.g., spot lights, cone lights, and the like can be simulated by varying the value of n in the equation $F = \cos\theta_v (\cos\theta_s)^n$. Distribution patterns approximating those of spot lights, cone lights and other types of positional lights can also be simulated.

The present invention may be embodied in other specific forms without departing from the spirit or essential attributes thereof and, accordingly, reference should be made to the appended claims rather than to the foregoing specification as indicating the scope of the invention.

APPENDIX A

```
/*s------------------------------------------------------------
** Implementation Strategy :
**                  z = 1.0         _____    ---- Area Light
**        z
**        |  x
**        | /
**        |/
**        ------y
**
**                  z = [0.2]      ____ ____  ----Shadow Polygon [off]
**
**
**                  z = 0.0       _._._._._._.___  ----Base Polygon
**                                                \
**                                                 \ ----Mesh
**   Portability :       PORTABLE
*****************************************************************M*/
#include      <math.h>
#include      <starbase.c.h>
#include      "sys.if"

define PI     3.1415927 double  sqrt ();
double  drand48 ();
int     rand ();

typedef struct {
double  x, y ;
} PT, *P_PT;

typedef struct {
int     x, y ;
} IPT;

typedef struct {
double  x, y, z ;
} VTX, *P_VTX;

typedef struct {
double  r,g,b ;
} CLR, *P_CLR ;

typedef struct {
float   x, y, z ;
float   r, g, b ;
} VTXC, *P_VTXC ;

typedef long BOOL;

/* shadow polygon pts, 2 outlines */
#define NUM_PTS 32
#define NUM_OUTLINES    2
long    ShadowPolyOn = 0 ;
double  ShadowZ = 0.2 ;
long    NumPts[ NUM_OUTLINES ] = { 0, 0 } ;
VTX     Pts[ 2 * NUM_PTS ] ;
CLR     ShadowPolyClr ;
```

```
/* square area light */
double  LightZ = 1.0;
long    LightSamplesX = 1 ;   /* should be perfect square */
long    LightSamplesY = 1 ;   /* should be perfect square */
double  LightJitterMag = 0.0 ;
PT      LightMin  ;
PT      LightSz   ;
CLR     LightClr  ;
double  LightNx = 0.0 ;
double  LightNy = 0.0 ;
double  LightNz = -1.0 ;
double  RotationAngle = 0.0;
double  LightRotMtx [ 3 ][ 2 ] = { ( 1, 0 ),
                                   ( 0, 1 ),
                                   ( 0, 0 ) };

/* base polygon */
/* MeshX * MeshY <= MAX_BASE_SAMPLES */
#define  MAX_BASE_SAMPLES       10000   /* 100 by 100 */
#define  BASE_Z         0.0
long    MeshX = 3 ;
long    MeshY = 3 ;
PT      BaseMin ;
PT      BaseMax ;
CLR     BaseClr ;
double  BaseNx = 0.0 ;
double  BaseNy = 0.0 ;
double  BaseNz = 1.0 ;
CLR     BaseRadIn[ MAX_BASE_SAMPLES ];

/* Random Number Generator */
long    RandSelect = 0 ;
long    RandSeed = 613729 ;
long    Nrand = 1;
double  GaussFac = 1.0;
double  GaussAdd = 0.0;

/* Filters */
#define NO_FILTER       0
#define STAR_FILTER     1
#define NEIGHBOR_FILTER 2
#define PGON_FILTER     3
define PGON_NEIGHBOR_FILTER    4 long FilterSelect = 0;
double  CenterWt = 1.0 ;
double  NeighborWt = 0.0 ;
double  CornerWt = 0.0 ;

/* histogram */
long    HistBuckets = 100;
long    HistSamples = 10000;
long    Hist[ 2000 ];
#define HIST_OFF_X      100
#define HIST_OFF_Y      00
#define HIST_SZ_X       200
#define HIST_SZ_Y       300.0

/* Starbase */
int     Fd;
double  DisplayScale = 300.0;
CLR     AmbientClr ;
VTXC    Clist[ MAX_BASE_SAMPLES ];
camera_arg      SceneCam, BaseCam;

/*************** init *************************************/
void test_init ()
```

```
{
long      i;
CLR       clr;

LightMin.x = 0.45;    LightMin.y = 0.45;
   LightSz.x = 0.1;      LightSz.y = 0.1;
   LightClr.r = 1.0;     LightClr.g = 1.0;   LightClr.b = 1.0;
   AmbientClr.r = 0.0;   AmbientClr.g = 0.0; AmbientClr.b = 0.0;

BaseMin.x = 0.0;   BaseMin.y = 0.0;
   BaseMax.x = 1.0;   BaseMax.y = 1.0;
   BaseClr.r = 1.0;   BaseClr.g = 1.0;   BaseClr.b = 1.0;

clr.r = 1.0;   clr.g = 1.0;   clr.b = 1.0;
   for ( i = 0; i < MAX_BASE_SAMPLES; i++ ) {
      BaseRadIn[ i ] = clr;
   }

ShadowPolyClr.r = 0.3;  ShadowPolyClr.g = 0.3;  ShadowPolyClr.b = 0.6;

/* init random */
   srand ( RandSeed );
   srand48 ( RandSeed );

/* init starbase */
   Fd = gopen ( "/dev/crt", OUTDEV, "hp98721", INIT|THREE_D|MODEL_XFORM );

/* init cameras */
   BaseCam.camx = 0.5 ; BaseCam.camy = 0.5; BaseCam.camz = 1.0;
   BaseCam.refx = 0.5 ; BaseCam.refy = 0.5; BaseCam.refz = 0.0;
   BaseCam.field_of_view = 70.0;
   BaseCam.front = 0.5 ; BaseCam.back = 2.5 ;
   BaseCam.upx = 0.0 ; BaseCam.upy = 1.0; BaseCam.upz = 0.0;

SceneCam = BaseCam;

shade_mode ( Fd, CMAP_FULL|INIT, FALSE );
   hidden_surface ( Fd, TRUE, FALSE );
   bf_control ( Fd, FALSE, FALSE );
   interior_style ( Fd, INT_SOLID, FALSE );
   bf_interior_style ( Fd, INT_SOLID, FALSE );
   perimeter_color ( Fd, 0.0, 1.0, 1.0 );
   clear_control ( Fd, CLEAR_DISPLAY_SURFACE|CLEAR_ALL_BANKS|CLEAR_ZBUFFER);
   background_color( Fd, 0.7, 0.7, 0.7 );
   depth_indicator ( Fd, FALSE, FALSE );
   marker_type ( Fd, 0 );
   marker_color( Fd, 1.0, 1.0, 0.4 );
/* clip_indicator ( Fd, CLIP_OFF ); */
   clear_view_surface ( Fd );
   make_picture_current ( Fd );

}

/***************** in    of shadow poly ************* *****/
BOOL InOut ( pt )
VTX       pt;
{
long      crossings, o, n;
VTX       p0, p1;

for ( o = 0, crossings = 0; o < NUM_OUTLINES; o++ ) {
      p0 = Pts [ o * NUM_PTS ];
      p0.y -= pt.y ;

for ( n = 0; n < NumPts[ o ] ; n++ ) {
         p1 = Pts [ o * NUM_PTS + n ];
         p1.y -= pt.y ;
```

```
        if ( (p0.y < 0.0) != (p1.y < 0.0) ) {
            if ( p0.x > pt.x ) {
                if ( p1.x > pt.x ) {
                    ++crossings;
                } else if ((p0.x-p0.y * (p1.x-p0.x)/(p1.y-p0.y)) > pt.x ) {
                    ++crossings;
                }
            } else if (( p1.x > pt.x )
                && ((p0.x-p0.y * (p1.x-p0.x)/(p1.y-p0.y)) > pt.x )) {
                ++crossings;
            }
        }
        p0 = p1;
    }
  }
  return ( crossings & 1 );
}

/*************** intersect shadow poly *******************/
BOOL Intersect ( origin, dest, z )
VTX     origin, dest;
double  z;
{
double  dx, dy, dz, t, len;
PT      pt;

dx = dest.x - origin.x;
   dy = dest.y - origin.y;
   dz = dest.z - origin.z;

len = sqrt( dx * dx + dy * dy + dz * dz ) ;
   dx /= len; dy /= len; dz /= len;

t = ( z - origin.z ) / dz;

pt.x = origin.x + t * dx;
   pt.y = origin.y + t * dy;

return ( InOut ( pt ) );

}

/*************** random ************************************/
double Random ( )       /* 0.0 ... 1.0 */
{
double  r;
int     i;
switch ( RandSelec  {
   case 1 :
      r = drand48 ();
   break;

case 2 :
      for ( r = i = 0; i < Nrand; ++i ) {
         r += (double) rand ();
      }
      r = GaussFac * r - GaussAdd;
   break;

case 0 :
   default :
      r = (double) rand ();
      r /= 32767.0;
   break;
}
```

```
      return ( r );
}

/**************** get random sample point w/in a box ********/
VTX GetSamplePt ( xmin, ymin, xmax, ymax, mag, rotMtx )
double  xmin, ymin, xmax, ymax, mag;
double rotMtx[3][2];
{
VTX      p, rp;
double   r;

p.z = rp.z = LightZ ;

r = 0.5 + mag * ( Random () - 0.5 );
   p.x = xmin + r * ( xmax - xmin );

r = 0.5 + mag * ( Random () - 0.5 );
   p.y = ymin + r * ( ymax - ymin );

/* rotate sample */
   if ( rotMtx != NULL ) {
      rp.x =
        rotMtx[0][0] * p.x + rotMtx[1][0] * p.y + rotMtx[2][0];
      rp.y =
        rotMtx[0][1] * p.x + rotMtx[1][1] * p.y + rotMtx[2][1];
      return ( rp );
   } return ( p );
}

/**************** compute rad for sample ******************/
double ComputeFF ( rcv )
VTX      rcv;
{
double  dx, dy, dz;
double  w, w2, ff;
double  xStep, yStep;
double  lx, ly;
double  area, cosTheta, cosPhi;
VTX     light;
long    i, j;

xStep = LightSz.x / LightSamplesX ;
   yStep = LightSz.y / LightSamplesY ;

area = xStep * ySte for ( i=0, ly = LightMin.y, ff = 0.0;
      i < LightSamplesY;
      i++, ly += yStep
){
   for ( j=0, lx = LightMin.x;
         j < LightSamplesX;
         j++, lx += xStep
   ) { light=GetSamplePt( lx, ly, lx + xStep, ly + yStep, LightJitterMag, NULL);

if ( ! ShadowPolyOn || ! Intersect ( rcv, light, ShadowZ ) ) { dx = rcv.x - light.x ;
         dy = rcv.y - light.y ;
         dz = rcv.z - light.z ;

w2 = dx * dx + dy * dy + dz * dz;
```

```
            w = sqrt ( w2 );
            dx /= w;    dy /= w;    dz /= w;

cosTheta = LightNx * -dx + LightNy * -dy + LightNz * -dz;
            cosPhi =  BaseNx * dx + BaseNy * dy + BaseNz * dz;

ff += cosTheta * cosPhi * area / ( PI * w2 + area );
        }
      }
   }
   return ( ff );
}

/*************** sample light *****************************/
CLR ComputeRad ( rcv )
VTX     rcv;
{
CLR     clr;
double  ff ;

ff = ComputeFF ( rcv );

clr.r = BaseClr.r * LightClr.r * ff;
    clr.g = BaseClr.g * LightClr.g * ff;
    clr.b = BaseClr.b * LightClr.b * ff;

return ( clr );

}

/*************** sample base *****************************/
void SampleBase ()
{
long    i, j;
VTX     pt;
double  xStep, yStep;

pt.z = BASE_Z;

if ( MeshX < 3 ) MeshX = 3;
    if ( MeshY < 3 ) MeshY = 3;
    xStep = ( BaseMax.x   BaseMin.x ) / ( MeshX - 1 )
    yStep = ( BaseMax.y   BaseMin.y ) / ( MeshY - 1 )

for ( pt.y = BaseMin.y, i = 0;
          i < MeshY;
          i++, pt.y += yStep
    ){
       for ( pt.x = BaseMin.x, j = 0;
             j < MeshX;
             j++, pt.x += xStep
       ){

BaseRadIn[ i * MeshX + j ] = ComputeRad ( pt );

}
    }
}

/*************** add a sample to a filter ****************/
void AccumFilterSample ( p_sum, x, y )
P_CLR   p_sum;
long    x, y;
{
```

```
        if ( x < 0 ) x = 0;
        if ( x > MeshX - 1 ) x = MeshX - 1;
        if ( y < 0 ) y = 0;
        if ( y > MeshY - 1 ) y = MeshY - 1;

y = y * MeshX + x;
        p_sum->r += BaseRadIn[ y ].r;
        p_sum->g += BaseRadIn[ y ].g;
        p_sum->b += BaseRadIn[ y ].b;
}

/*************** filter base *****************************/
void FilterBase ()
{
long    i, j, n;
CLR     c, s;
double  w;

for ( i = 0; i < MeshX; i++ ) { for ( j = 0; j < MeshY; j++ ) { n = j * MeshX + i;

switch ( FilterSelect ) { case STAR_FILTER :
                /* 4 + 1 = 5 neighbors of sample */
                s.r = s.g = s.b = 0.0;
                AccumFilterSample ( &s, i-1, j );
                AccumFilterSample ( &s, i+1, j );
                AccumFilterSample ( &s, i, j+1 );
                AccumFilterSample ( &s, i, j-1 );
                s.r *= NeighborWt; s.g *= NeighborWt; s.b *= NeighborWt;

c.r = c.g = c.b = 0.0;
                AccumFilterSample ( &c, i-1, j );
                s.r += CenterWt * c.r; s.g += CenterWt * c.g; s.b += CenterWt * c.b;

w = 1.0 / (4.0 * NeighborWt + CenterWt);
                s.r *= w;   s.g *= w;  s.b *= w;

Clist[ n ].r = s.r; Clist[ n ].g = s.g;  Clist[ n ].b = s.b;
                break;

case NEIGHBOR_FILTER :
                /* 4 + 4 + 1 = 9 neighbors of sample */
                s.r = s.g = s.b = 0.0;
                AccumFilterSample ( &s, i-1, j );
                AccumFilterSample ( &s, i+1, j );
                AccumFilterSample ( &s, i, j+1 );
                AccumFilterSample ( &s, i, j-1 );
                s.r *= NeighborWt; s.g *= NeighborWt; s.b *= NeighborWt;

c.r = c.g = c.b = 0.0;
                AccumFilterSample ( &c, i-1, j-1 );
                AccumFilterSample ( &c, i+1, j+1 );
                AccumFilterSample ( &c, i-1, j+1 );
                AccumFilterSample ( &c, i+1, j-1 );
                s.r += CornerWt * c.r; s.g += CornerWt * c.g; s.b += CornerWt * c.b;

c.r = c.g = c.b = 0.0;
                AccumFilterSample ( &c, i, j );
                s.r += CenterWt * c.r; s.g += CenterWt * c.g; s.b += CenterWt * c.b;
```

```
            w = 1.0 / ( 4.0 * NeighborWt + 4.0 * CornerWt + CenterWt );
            s.r *= w;  s.g *= w;  s.b *= w;

Clist[ n ].r = s.r; Clist[ n ].g = s.g;  Clist[ n ].b = s.b;
            break;

/************ for shooting *************
            case PGON_FILTER :
            s.r = s.g = s.b = 0.0;
            AccumFilterSample ( &s, i-1, j-1 );
            AccumFilterSample ( &s, i-1, j );
            AccumFilterSample ( &s, i, j-1 );
            AccumFilterSample ( &s, i, j );

w = 1.0 / 4.0;
            s.r *= w; s.g *= w; s.b *= w;

Clist[ n ].r = s.r; Clist[ n ].g = s.g;  Clist[ n ].b = s.b;

break;

case PGON_NEIGHBOR_FILTER :
            c.r = c.g = c.b = 0.0;
            AccumFilterSample ( &c, i-1, j-1 );
            AccumFilterSample ( &c, i-1, j );
            AccumFilterSample ( &c, i, j-1 );
            AccumFilterSample ( &c, i, j );
            s.r = CenterWt * c.r; s.g = CenterWt * c.g; s.b = CenterWt * c.b;

c.r = c.g = c.b = 0.0;
            AccumFilterSample ( &c, i-2, j-1 );
            AccumFilterSample ( &c, i-2, j );
            AccumFilterSample ( &c, i+1, j-1 );
            AccumFilterSample ( &c, i+1, j );

AccumFilterSample ( &c, i-1, j-2 );
            AccumFilterSample ( &c, i-1, j+1 );
            AccumFilterSample ( &c, i, j-2 );
            AccumFilterSample ( &c, i, j+1 );
            s.r += NeighborWt * c.r; s.g += NeighborWt *  c.g;
            s.b += NeighborWt * c.b;
            c.r = c.g = c.b = 0.0;
            AccumFilterSample ( &c, i-2, j-2 );
            AccumFilterSample ( &c, i-2, j+1 );
            AccumFilterSample ( &c, i+1, j-2 );
            AccumFilterSample ( &c, i+1, j+1 );
            s.r = CornerWt * c.r; s.g = CornerWt * c.g; s.b = CornerWt * c.b;

w = 1.0 / ( 4.0 * CenterWt + 8.0 * NeighborWt + 4.0 * CornerWt );
            s.r *= w; s.g *= w; s.b *= w;

Clist[ n ].r = s.r; Clist[ n ].g = s.g;  Clist[ n ].b = s.b;
            break;
***********************************************/ case NO_FILTER :
            default :
            /* no filter */
            c.r = c.g = c.b = 0.0;
            AccumFilterSample ( &c, i, j );
            Clist[ n ].r = c.r; Clist[ n ].g = c.g; Clist[ n ].b = c.b;

break;
        }
        Clist[ n ].r = Clist[ n ].r * DisplayScale + AmbientClr.r;
        Clist[ n ].g = Clist[ n ].g * DisplayScale + AmbientClr.g;
        Clist[ n ].b = Clist[ n ].b * DisplayScale + AmbientClr.b;
```

```
            if ( DisplayScale != 1 ) {
                if ( Clist[ n ].r > 1.0 ) Clist[ n ].r-1.0;
                if ( Clist[ n ].g > 1.0 ) Clist[ n ].g-1.0;
                if ( Clist[ n ].b > 1.0 ) Clist[ n ].b-1.0;
            }
        }
    }
}

/*************** display base ***************************/
void DisplayBase ()
{
double   xStep, yStep, x, y, max;
long     i, j, n;

xStep = ( BaseMax.x - BaseMin.x ) / ( MeshX - 1 ) ;
    yStep = ( BaseMax.y - BaseMin.y ) / ( MeshY - 1 ) ;

for ( y = BaseMin.y, i = 0;
          i < MeshY;
          i++, y += yStep
    ){
        for ( x = BaseMin.x, j = 0;
              j < MeshX;
              j++, x += xStep
        ){
            n = i * MeshX + j ;
            Clist[ n ].x = x;  Clist[ n ].y = y;  Clist[ n ].z = BASE_Z;

}
    }

FilterBase ();

if ( DisplayScale == 1.0 ) {
        max = 0.0;
        for ( i = 0 ; i < MeshY * MeshX; i++ ) {
            if ( max < Clist[ i ].r ) max = Clist[i].r;
            if ( max < Clist[ i ].g ) max = Clist[i].g;
            if ( max < Clist[ i ].b ) max = Clist[i].b;
        }
        max = 1.0 / max;
        for ( i = 0 ; i < MeshY * MeshX; i++ ) {
            Clist[ i ].r = max * Clist[i].r;
            Clist[ i ].g = max * Clist[i].g;
            Clist[ i ].b = max * Clist[i].b;
        }
    } vertex_format ( Fd, 3, 3, 1, 0, 0 );
    quadrilateral_mesh ( Fd, Clist, MeshY, MeshX, NULL );
    make_picture_current ( Fd );

}

/*************** display scene ***************************/
void DisplayScene ()
{
long    i;

DisplayBase();

if ( NumPts[ 1 ] > 0 ) {
        /* do partial polygon */
        for ( i=0; i < NumPts[ 0 ]; i++ ) {
```

```
            Clist[ i ].x = Pts[ i ].x;
            Clist[ i ].y = Pts[ i ].y;
            Clist[ i ].z = ShadowZ;
            Clist[ i ].r = ShadowPolyClr.r;
            Clist[ i ].g = ShadowPolyClr.g;
            Clist[ i ].b = ShadowPolyClr.b;
         }
         partial_polygon3d ( Fd, Clist, NumPts[0], 0, 0 );
      } if ( NumPts[ 0 ] > 0 ) {
      /* do shadow polygon */
      for ( i=0; i < NumPts[ 0 ]; i++ ) {
         Clist[ i ].x = Pts[ i ].x;
         Clist[ i ].y = Pts[ i ].y;
         Clist[ i ].z = ShadowZ;
         Clist[ i ].r = ShadowPolyClr.r;
         Clist[ i ].g = ShadowPolyClr.g;
         Clist[ i ].b = ShadowPolyClr.b;
      }
      polygon3d ( Fd, Clist, NumPts[0], 0 );
/************
      for ( i=0; i < NumPts[ 0 ]; i++ ) {
         Clist[ i ].x = Pts[ NumPts[0]-1-i ].x;
         Clist[ i ].y = Pts[ NumPts[0]-1-i ].y;
      }
      polygon3d ( Fd, Clist, NumPts[0], 0 );
************/
   }

/* do light */
   Clist[ 0 ].x = LightMin.x;
   Clist[ 0 ].y = LightMin.y;
   Clist[ 1 ].x = LightMin.x + LightSz.x;
   Clist[ 1 ].y = LightMin.y;
   Clist[ 2 ].x = LightMin.x + LightSz.x;
   Clist[ 2 ].y = LightMin.y + LightSz.y;
   Clist[ 3 ].x = LightMin.x;
   Clist[ 3 ].y = LightMin.y + LightSz.y;
   for ( i=0; i < 4; i++ ) {
      Clist[ i ].z = LtZ;
      Clist[ i ].r = LightClr.r;
      Clist[ i ].g = LightClr.g;
      Clist[ i ].b = LightClr.b;
   }
   polygon3d ( Fd, Clist, 4, 0 );
/************
   Clist[ 3 ].x = LightMin.x + LightSz.x;
   Clist[ 3 ].y = LightMin.y;
   Clist[ 1 ].x = LightMin.x;
   Clist[ 1 ].y = LightMin.y + LightSz.y;
   polygon3d ( Fd, Clist, 4, 0 );
************/

}

/*************** testbed driver *************************/
PUBLIC LONG       /* OK or FAIL */
test_cmd ( line )
P_STR    line;
{
CHAR     chr;
CHAR     aux[ 80 ];
long     i, j;
VTX      pt;
```

```c
IPT     ipt;
double  ff, x, y;
double  min, max;

switch ( line[ 0 ] ) { case '1' :          /* light */
            switch ( line[ 1 ] ) {
                case 'p' :          /* light min & sz */
                    sscanf ( line, "%c %c %lg %lg %lg %lg", &chr, &chr
                    , &LightMin.x, &LightMin.y, &LightSz.x, &LightSz.y );
                    break;

case 'c' :          /* light color */
                    sscanf ( line, "%c %c %lg %lg %lg", &chr, &chr
                    , &LightClr.r, &LightClr.g, &LightClr.b );
                    break;

case 'n' :          /* light normal */
                    sscanf ( line, "%c %c %lg %lg %lg", &chr, &chr
                    , &LightNx, &LightNy, &LightNz );
                    break;

case 's' :          /* light samples */
                    sscanf ( line, "%c %c %d %d %lg", &chr, &chr
                    , &LightSamplesX, &LightSamplesY, &LightJitterMag );
                    break;

case 'r' :          /* light rotation */
                    break;

case 'z' :          /* light z */
                    sscanf ( line, "%c%c %lg", &chr, &chr, &LightZ );
                    break;

case 'a' :          /* light atts */
                    printf ( "LightMin - %g, %g\n", LightMin.x, LightMin.y );
                    printf ( "LightZ - %g\n", LightZ );
                    printf ( "LightSz - %g, %g\n", LightS   , LightSz.y );
                    printf ( "LightN - %g, %g, %g\n", Ligh    , LightNy, LightNz);
                    printf ( "LightClr - %g, %g, %g\n", LightClr.r, LightClr.g,
                        LightClr.b );
                    printf ( "LightSamples - %d, %d JitterMag - %g \n",
                        LightSamplesX, LightSamplesY, LightJitterMag );
                    break;
            }
            break;

case 'b' :          /* base */
            switch ( line[ 1 ] ) {
                case 'p' :          /* base min & sz */
                    break;

case 'c' :          /* base color */
                    sscanf ( line, "%c %c %lg %lg %lg", &chr, &chr
                    , &BaseClr.r, &BaseClr.g, &BaseClr.b );
                    break;

case 'n' :          /* base normal */
                    sscanf ( line, "%c %c %lg %lg %lg", &chr, &chr
                    , &BaseNx, &BaseNy, &BaseNz );
                    break;

case 's' :          /* base samples */
                    sscanf ( line, "%c %c %d %d", &chr, &chr
```

```
                    , &MeshX, &MeshY );
            break;

case 'a' :          /* base atts */
                printf ( "BaseN - %g, %g, %g\n", BaseNx, BaseNy, BaseNz );
                printf ( "BaseClr - %g, %g, %g\n", BaseClr.r, BaseClr.g,
                    BaseClr.b );
                printf ( "MeshX - %d, MeshY - %d \n", MeshX, MeshY );
            break;

)
    break;

case 'd' :          /* display */
        switch ( line[ 1 ] ) (
            case 's' :          /* display scale */
                sscanf ( line, "%c %c %lg", &chr, &chr
                    , &DisplayScale );
            break;
            case 'w' : /* display world view */
                view_camera ( Fd, &SceneCam );
                clear_view_surface ( Fd );
                DisplayScene ();
                make_picture_current ( Fd );
            break;

case 'a' :          /* display atts */
                printf ( "Display Scale - %g\n", DisplayScale );
                printf ( "AmbientClr - %g, %g, %g\n", AmbientClr.r, AmbientClr.g,
                    AmbientClr.b );
            break;

)
    break;

case 'v' :          /* view cameras */
        switch ( line[ 1 ] ) (
            case 'a' :
                printf ( "Camera Pos : ( %g, %g, %g )"
                    SceneCam.camx, SceneCam.camy, SceneCam.camz );
                printf ( "Camera Ref : ( %g, %g, %g )\n",
                    SceneCam.refx, SceneCam.refy, SceneCam.refz );
                printf ( "Camera Up  : ( %g, %g, %g )\n",
                    SceneCam.upx, SceneCam.upy, SceneCam.upz );
                printf ( "Camera Clip: %g, %g\n",
                    SceneCam.front, SceneCam.back );
                printf ( "Camera Field of View : %g\n",
                    SceneCam.field_of_view );
            break;
            case 'p' :
                sscanf ( line, "%c%c %g %g %g", &chr, &chr, &SceneCam.camx, &SceneCa
                    &SceneCam.camz );
            break;
            case 'r' :
                sscanf ( line, "%c%c %g %g %g", &chr, &chr, &SceneCam.refx, &SceneCa
                    &SceneCam.refz );
            break;
            case 'u' :
                sscanf ( line, "%c%c %g %g %g", &chr, &chr, &SceneCam.upx, &SceneCam
                    &SceneCam.upz );
            break;
            case 'c' :
                sscanf ( line, "%c%c %g %g", &chr, &chr, &SceneCam.front, &SceneCam.
            break;
            case 'f' :
                sscanf ( line, "%c%c %g", &chr, &chr, &SceneCam.field_of_view );
            break;
```

```c
        }
        break;

case 'f' :          /* filter */
        switch ( line[ 1 ] ) {
            case 't' :          /* filter type */
                sscanf ( line, "%c%c %d", &chr, &chr, &FilterSelect );
                break;
            case 'w' :          /* filter weight */
                sscanf ( line, "%c%c %lg %lg %lg", &chr, &chr,
                    &CenterWt, &NeighborWt, &CornerWt );
                break;
            case 'b' :
                DisplayBase ();
                break;
            case 'a' :
                printf( "Filter type is %d\n", FilterSelect );
                printf( "Weights are Center - %g, Neighbor - %g, Corner - %g\n"
                    , CenterWt, NeighborWt, CornerWt );
                break;
        }
        break;

case 'a' :          /* ambient */
        switch ( line[ 1 ] ) {
            case 'm' :
                sscanf ( line, "%c %c %lg %lg %lg", &chr, &chr
                    , &AmbientClr.r, &AmbientClr.g, &AmbientClr.b );
                break;
        }
        break;

case 'r' :          /* random */
        switch ( line[ 1 ] ) {
            case 't' :          /* random type */
                sscanf ( line, "%c%c %d %d %d", &chr, &chr,
                    &RandSelect, &RandSeed, &Nrand );

/* in' random */
            srand(   RandSeed );
            srand48 ( RandSeed );
            GaussAdd = sqrt ( (double)( 3.0 * Nrand ));
            GaussFac = GaussAdd / (double)(Nrand * 32767);
            GaussAdd = ( GaussAdd - 1.0 ) / 2.0 ;
            break;
        case 'b' :
            sscanf ( line, "%c%c %d", &chr, &chr, &HistBuckets );
            break;
        case 's' :
            sscanf ( line, "%c%c %d", &chr, &chr, &HistSamples );
            clear_view_surface ( Fd );
            for ( i = 0; i < HistSamples; ++i ){
                ipt.x = (int)( Random() * 800.0 + 200.0 );
                ipt.y = (int)( 900.0 - Random() * 800.0 );
                dcpolymarker( Fd, &ipt, 1, 0 );
            }
            make_picture_current( Fd );
            break;
        case 'a' :
            printf ( "Rand Select - %d \n", RandSelect );
            printf ( "Rand Seed   - %d \n", RandSeed );
            printf ( "Num Buckets - %d \n", HistBuckets );
            printf ( "Num samples - %d \n", HistSamples );
            printf ( "Num Gauss Rand - %d \n", Nrand );
            printf ( "Gauss Fac, Add - %g, %g \n", GaussFac, GaussAdd );
            min = HistSamples ; max = 0;
            for ( i = 0; i < HistBuckets; i++ ) {
```

```
            min = ( Hist[ i ] < min ? Hist[ i ] : min );
            max = ( Hist[ i ] > max ? Hist[ i ] : max );
        )
        printf ( "Min = %g, Max = %g\n", min, max );
    break;

case 'h' :              /* random histogram */
        sscanf ( line, "%c%c %d", &chr, &chr, &HistSamples );
        for ( i=0; i < HistBuckets; i++ ) Hist[ i ] = 0;
        for ( i=0; i < HistSamples; i++ ) {
            j = (LONG)( Random () * HistBuckets );
            Hist[ j ]++;
        )
        line_color ( Fd, 1.0, 0.0, 0.0 );
        clear_view_surface ( Fd );

min = HistSamples ; max = 0;
        for ( i = 0; i < HistBuckets; i++ ) (
            min = ( Hist[ i ] < min ? Hist[ i ] : min );
            max = ( Hist[ i ] > max ? Hist[ i ] : max );
        )
        min = min / 2;
        max = (double)HIST_SZ_Y / (max-min);

for ( i=0; i < HistBuckets; i++ ) (
            x = i + HIST_OFF_X;
            dcmove ( Fd, (int)x, HIST_OFF_Y );
            /* y = HIST_OFF_Y - (double)Hist[i] * (double)HIST_SZ_Y * HistB
            y = HIST_OFF_Y - (((double)Hist[i] - min ) * max ) ;
            dcdraw ( Fd, (int)x, (int)y );
        )
        make_picture_current ( Fd );
    break;
    case 'l' :              /* random histogram */
        for ( i=0; i < HistBuckets; i++ ) (
            printf ( "Bucket[ %d ] = %d\n", i, Hist[i] );
        )
        break;
    )
    break;

case 'c' :          /* compute */
        switch ( line[ 1 ] ) (
            case 'p' :          /* compute point */
                sscanf ( line, "%c%c %lg %lg", &chr, &chr,
                    &pt.x, &pt.y );
                pt.z = BASE_Z;
                ff = ComputeFF ( pt );
                printf(
    "Form Factor for (%d, %d) samples at pt (%g, %g), z = %g is %g\n"
                    , LightSamplesX, LightSamplesY, pt.x, pt.y, LightZ, ff );
            break;

case 'b' :          /* compute base */
                SampleBase ();
                view_camera ( Fd, &BaseCam );
                clear_view_surface( Fd );
                DisplayBase ();
            break;

)
    break;

case 's' :          /* shadow poly */
        switch ( line[ 1 ] ) (
            case 'h' :          /* shadow on */
                sscanf ( line, "%c%c %d", &chr, &chr
```

```c
            , &ShadowPolyOn );
        break;

case 'p' :          /* point */
            sscanf ( line, "%c%c %d %d %lg %lg", &chr, &chr
                , &i, &j, &pt.x, &pt.y );
            pt.z = 0.0;
            Pts[ i * NUM_PTS + j ] = pt;
        break;

case 'c' :          /* color */
            sscanf ( line, "%c%c %lg %lg %lg", &chr, &chr
                , &ShadowPolyClr.r, &ShadowPolyClr.g, &ShadowPolyClr.b );
        break;

case 'z' :          /* z */
            sscanf ( line, "%c%c %lg", &chr, &chr
                , &ShadowZ );
        break;

case 'o' :          /* outlines */
            sscanf ( line, "%c%c %d %d", &chr, &chr
                , &NumPts[ 0 ], &NumPts[ 1 ] );
        break;

case 'a' :          /* shadow atts */
            printf ( "Shadow enable = %d\n", ShadowPolyOn );
            printf ( "Outline0 = %d, Outline1 = %d\n", NumPts[0], NumPts[1]
            );
            printf ( "ShadowPolyClr = %g, %g, %g\n", ShadowPolyClr.r
                , ShadowPolyClr.g, ShadowPolyClr.b );
            printf ( "ShadowZ = %g\n", ShadowZ );
        break;

case 'l' :          /* list shadow points */
            sscanf ( line, "%c%c %d", &chr, &chr, &j );
            if ( j    1 ) {
                for    =0; i<NumPts[1]; i++ ) {
                    printf ( "%d : ( %g, %g )\n", i,
                        Pts[ NUM_PTS+i].x, Pts[ NUM_PTS+i].y );
                }
            } else {
                for ( i=0; i<NumPts[0]; i++ ) {
                    printf ( "%d : ( %g, %g )\n", i,
                        Pts[i].x, Pts[i].y );
                }
            }
        break;

}
break;

/**  ...... more commands ...... **/ case '?' :
    printf ( "Shadow Sampling Test Bed\n" );
    printf ( "-----------------------------------------------------------\n" );
    printf ( "lp px py sx sy   Light position and size \n");
    printf ( "lc r  g  b       Light color\n");
    printf ( "ln nx ny nz      Light normal\n");
    printf ( "lz z             Light Z position\n" );
    printf ( "ls nx ny jit     Light NumSamples x & y, & Jitter Mag 0..1\n");
    printf ( "la               Light attributes \n");
    printf ( "am r  g  b       Ambient Light color\n");
    printf ( "bs x  y          Base mesh x and y\n");
    printf ( "bc r  g  b       Base color\n");
```

```
        printf ( "bn nx ny nz      Base normal \n");
        printf ( "ba               Base attributes \n");
        printf ( "ds scale         Display Scale \n");
        printf ( "ds 1             Auto Display Scale \n");
        printf ( "dw               Display World View of Scene \n");
        printf ( "da               Display Atts \n");
        printf ( "ft t             Filter type \n" );
        printf ( "fw cn ne cr      Filter Weight: center, neighbor, & corner\n" );
        printf ( "fa               Filter Atts \n");
        printf ( "fb               ReFilter & Display Base \n");
        printf ( "rt sel seed      Random select & seed\n");
        printf ( "rh n             Random Histogram, #samples\n");
        printf ( "rb n             Random Histogram, #buckets\n");
        printf ( "ra               Random attributes\n");
        printf ( "cp x y           Compute ff for this pt \n");
        printf ( "cb               Compute & display base \n");
        printf ( "sh 0/1           Enable/disable shadows \n");
        printf ( "sp 0/1 n x y     shadow poly pt, outline 0/1, pt n, at x y\n");
        printf ( "sc r g b         Shadow color \n");
        printf ( "sz z             Shadow Z \n" );
        printf ( "so n0 nl         Number of pts in each shadow oultine \n" );
        printf ( "sa               Shadow Atts \n");
        printf ( "sl 0/1           List Shadow points in outline 0/1\n");
        printf ( "va               View Attributes\n");
        printf ( "vp x y z         View Position \n");
        printf ( "vr x y z         View reference\n");
        printf ( "vu x y z         View up\n");
        printf ( "vc f b           View clip, front & back\n");
        printf ( "vf ang           Field of View\n");
      break;

default:
      return ( FAIL );
  }
  return ( OK );
}
```

We claim:

1. A method of rendering, in a computer, and displaying on a computer graphice display device, a realistic three dimensional image of a scene, including realistic shading of objects in the scene by light emitters illuminating the scene, said method comprising the steps of:
 a) creating a geometric model of a scene to be rendered and storing data representative of said geometric model as a database in the computer, said data including at least the geometry and surface reflectivity of the light emitters and the objects in the scene to be rendered;
 b) approximating surfaces of each object in the scene as patches in three dimensional space, each patch being approximated as one or more elements defined by vertices;
 c) selecting from the database a source of irradiated light in the scene, the selected source defining a light source, the light source being either one of the light emitters or an object that reflects light emitted by one of the light emitters;
 d) determining, for each vertex, by ray tracing from the vertex to the light source, a form factor that represents the fraction of energy leaving the light source and arriving at the vertex;
 e) determining radiosity at each vertex based upon the form factors determined from step (d);
 f) repeating steps (c)–(e) a selected number of times, each time for a different light source, to obtain a plurality of radiosities collectively indicating global illumination of the scene; and,
 g) controlling the computer graphics display device to display the three dimensional image of the scene based upon the radiosities determined from step (f).

2. The method according to claim 1 wherein the light source selected in step (c) comprises a source surface having an area.

3. The method according to claim 2 wherein the source surface comprises a plurality of sample points, and wherein step (d) comprises the steps of: (i) determining, for each vertex, individual form factors for each of a selected number of sample points, each individual form factor being determined by ray tracing from the vertex to that sample point; and (ii) summing the individual form factors and dividing by the selected number of sample points to produce a total form factor for that vertex.

4. The method according to claim 3 wherein, in step (d)(i), the number of sample points for which individual form factors are determined is independently selected from vertex to vertex.

5. The method according to claim 3 wherein the individual form factor determined for each sample point has a magnitude and the magnitude is zero if, while ray tracing from the vertex to that sample point, the ray intersects an object in the scene before reaching the sample point.

6. The method according to claim 5 wherein the sample points are uniformly distributed across the source surface and the total form factor determined in step (d)(ii) for each vertex is computed according to a relationship of the form:

$$F = 1/n \sum_{i=1}^{n} \delta_i \frac{\cos\theta_{1i} \cos\theta_{2i}}{r_i^2 + A/n}$$

where:
F is the total form factor which specifies the fraction of energy leaving the source surface and arriving at the vertex;
n is the number of sample points on the source surface;
i represents one of the n sample points on the source surface (for i=1 to n);
$\delta_i$=0 if, while ray tracing from the vertex to sample point i, the ray intersects an object in the scene before reaching the sample point, and =1 if the ray does not intersect an object;
$\theta_{1i}$ is the angle between a surface normal of the source surface at the sample point i and the ray cast from the vertex to the sample point i during ray tracing;
$\theta_{2i}$ is the angle between the surface normal of the patch at the vertex and the ray cast from the vertex to the sample point i during ray tracing;
$r_i$ is the distance between the sample point i and the vertex; and,
A is the area of the source surface.

7. The method according to claim 5 wherein radiosity at a vertex (1) due to light irradiated from a source surface (2) is determined according to the relationship:

$$B_1 = P_1 B_2 A_2 \, 1/n \sum_{i=1}^{n} \delta_i \frac{\cos\theta_{1i} \cos\theta_{2i}}{\pi r_i^2 + A_2/n}$$

where:
$B_1$=radiosity at the vertex (1);
$P_1$=reflectivity at the vertex (1);
$B_2$=radiosity at the source surface (2);
$A_2$=area of the source surface (2);
n=number of sample points on the source surface (2);
i represents one of the n sample points on the source surface (2) (for i=1 to n);
$\delta$=0 if, while ray tracing from the vertex to sample point i, the ray intersects an object in the scene before reaching the sample point, and =1 if the ray does not intersect an object;
$\theta_{1i}$ is the angle between a surface normal of the source surface (2) at the sample point i and the ray cast from the vertex (1) to the sample point i during ray tracing;
$\theta_{2i}$ is the angle between the surface normal of the patch at the vertex (1) and the ray cast from the vertex (1) to the sample point i during ray tracing; and
$r_i$ is the distance between the sample point i and the vertex (1);

8. The method according to claim 3 wherein the individual form factor determined in step (d)(i) for each sample point is determined according to a relationship of the form:

$$F = \frac{\cos\theta_1 \cos\theta_2}{\pi r^2}$$

where:
F is the form factor from a sample point to a vertex;
$\theta_1$ is the angle between a surface normal of the source surface at the sample point and the ray cast from the vertex to the sample point during ray tracing;
$\theta_2$ is the angle between the surface normal of the patch at the vertex and the ray cast from the vertex to the sample point during ray tracing; and,
r is the distance between the sample point and the vertex.

9. The method according to claim 1 wherein radiosity is determined according to a relationship of the form:

$$B_i A_i = E_i A_i + P_i \sum_{j=1}^{n} B_j A_j F_{ji}$$

where:
n is the number of patches contributing to radiosity;
i represents one of the n patches where radiosity is determined;
$B_i$=radiosity of a patch i (energy per unit area);
$E_i$=emitted energy per unit area of patch i;
$P_i$=reflectivity of patch i;
$B_j$=radiosity of another patch j;
$F_{ji}$=form factor from patch j to patch i;
$A_i$=area of patch i; and,
$A_j$=area of patch j.

10. The method according to claim 1 wherein light sources are defined as having artificial distribution characteristics.

11. The method according to claim 1 wherein light sources are defined in accordance with relationships defining the form factors.

12. The method according to claim 11 wherein light sources are defined according to a relationship of the form:

$$F = \cos\theta_v (\cos\theta_s)^n$$

where:
F=the form factor;
$\theta_v$=the angle between a surface normal at a vertex and a ray cast from the vertex to a point on the light source;
$\theta_s$=the angle between a surface normal at the point on the light source and a ray cast from the vertex to the point on the light source; and,
n=a distribution characteristic of the light source.

13. The method according to claim 12 wherein light sources are defined as irradiating omnidirectional light from a point in space.

14. The method according to claim 11 wherein light sources are defined according to a relationship of the form:

$$F = (\cos\theta_s)^n$$

where:
F=the form factor;

$\theta_s$ = the angle between a surface normal at the light source and the direction in which light rays emanate from the light source; and, n = a distribution characteristic of the light source.

15. The method according to claim 14 wherein light sources are defined as irradiating unidirectional, parallel light rays over the scene.

16. The method according to claim 11 wherein light sources are defined as irradiating light having arbitrary quadratic attenuation.

17. The method according to claim 1 wherein light sources are defined as at least one of a point light, a positional light and a directional light.

18. A method of rendering, in a computer, and displaying on a computer graphics display device, a realistic three dimensional image of a scene, including realistic shading of objects in the scene by light emitters illuminating the scene, said method comprising the steps of:

a) creating a geometric model of a scene to be rendered and storing data representative of said geometric model as a database in the computer, said data including at least the geometry and surface reflectivity of light emitters and objects in the scene;

b) approximating surfaces of each object in the scene as patches in three dimensional space, each patch being approximated as one or more elements defined by vertices;

c) selecting from the database a source of irradiated light in the scene, the selected source of irradiated light being either one of the light emitters or a surface that reflects light emitted by one of the light emitters, the selected source defining a light source comprising a source surface having an area, said source surface comprising a plurality of sample points;

d) performing the following steps for each vertex:
  i) determining, for the vertex, individual form factors for each of a selected number of sample points, each individual form factor being determined by ray tracing from the vertex to that sample point; and
  ii) summing the individual form factors and dividing by the selected number of sample points to produce a total form factor for the vertex;

e) determining radiosity at each vertex based upon the form factors determined in step (d) for each vertex;

f) repeating steps (c)–(e) a selected number of times, each successive time the light source being redefined to be another source of irradiated light in the scene that provides the greatest energy output in the scene when the previously defined light source is disregarded, thereby obtaining a plurality of radiosities collectively indicating global illumination of the scene; and g) controlling the computer graphics display device to display the three dimensional image of the scene based upon the radiosities determined from step (f).

19. The method according to claim 18 wherein, in step (d)(i), the number of sample points for which individual form factors are determined is independently selected from vertex to vertex.

20. The method according to claim 18 wherein, in step (d)(i), the individual form factor determined for each sample point has a magnitude and the magnitude is zero if, while ray tracing from the vertex to that sample point, the ray intersects an object in the scene before reaching the sample point.

21. The method according to claim 18 wherein the sample points are uniformly distributed across the source surface and the total form factor determined in step (d)(ii) for each vertex is computed according to a relationship of the form:

$$F = 1/n \sum_{i=1}^{n} \delta_i \frac{\cos\theta_{1i} \cos\theta_{2i}}{r_i^2 + A/n}$$

where:

F is the total form factor which specifies the fraction of energy leaving the source surface and arriving at the vertex;

n is the number of sample points on the source surface;

i represents one of the n sample points on the source surface (for i = 1 to n);

$\delta_i$ = 0 if, while ray tracing from the vertex to sample point i, the ray intersects an object in the scene before reaching the sample point, and = 1 if the ray does not intersect an object;

$\theta_{1i}$ is the angle between a surface normal of the source surface at the sample point i and the ray cast from the vertex to the sample point i during ray tracing;

$\theta_{2i}$ is the angle between the surface normal of the patch at the vertex and the ray cast from the vertex to the sample point i during ray tracing;

$r_i$ is the distance between the sample point i and the vertex; and

A is the area of the source surface.

22. The method according to claim 18 wherein light sources are defined in accordance with a relationship defining the form factor and as being at least one of a point light and a positional light, the relationship being of the form:

$$F = \cos\theta_v (\cos\theta_s)^n$$

where:

F = the form factor;

$\theta_v$ = the angle between a surface normal at a vertex and a ray cast from the vertex to a point on the light source;

$\theta_s$ = the angle between a surface normal at the point on the light source and a ray cast from the vertex to the point on the light source; and, n = a distribution characteristic of the light source.

23. The method according to claim 18 wherein the light sources are defined according to a relationship of the form:

$$F = \cos\theta_v$$

where:

F = the form factor; and $\theta_v$ = the angle between a surface normal at the vertex and the direction from which light rays from the light source strike the vertex.

24. The method according to claim 18 wherein the light sources are defined as irradiating light having arbitrary quadratic attenuation.

25. A method of rendering, in a computer, and displaying on a computer graphics display device, a realistic three dimensional image of a scene, including realistic shading of objects in the scene by light emitters illuminating the scene, said method comprising the steps of:

a) creating a geometric model of a scene to be rendered and storing data representative of said geometric model as a database in the computer, said data including at least the geometry and surface reflectivity of light emitters and objects in the scene;

b) approximating surfaces of each object in the scene as patches in three dimensional space, each patch being approximated as one or more elements defined by vertices;

c) selecting a source of irradiated light in the scene, the selected source of irradiated light being either one of the light emitters or a surface that reflects light emitted by one of the light emitters, the selected source defining a light source comprising a source surface having an area, said source surface comprising a plurality of sample points;

d) performing the following steps for each vertex:

i) determining, for the vertex, individual form factors for each of a selected number of sample points, each individual form factor being determined by ray tracing from the vertex to that sample point, the individual form factor determined for each sample point having a magnitude, said magnitude being zero if, while ray tracing from the vertex to that sample point, the ray intersects an object in the scene before reaching the sample point, the number of sample points for which individual form factors are determined being independently selected from vertex to vertex; and ii) summing the individual form factors and dividing by the selected number of sample points to produce a total form factor for the vertex, the total form factor being computed according to a relationship of the form:

$$F = 1/n \sum_{i=1}^{n} \delta_i \frac{\cos\theta_{1i} \cos\theta_{2i}}{r_i^2 + A/n}$$

where:

F is the total form factor which specifies the fraction of energy leaving the source surface and arriving at the vertex;

n is the number of sample points on the source surface;

i represents one of the n sample points on the source surface (for i=1 to n);

$\beta_i$ controls the magnitude of the individual form factor for sample point i and equals 0 if, while ray tracing from the vertex to sample point i, the ray intersects an object in the scene before reaching the sample point, and equals 1 if the ray does not intersect an object;

$\theta_{1i}$ is the angle between a surface normal of the source surface at the sample point i and the ray cast from the vertex to the sample point i during ray tracing;

$\theta_{2i}$ is the angle between the surface normal of the patch at the vertex and the ray cast from the vertex to the sample point i during ray tracing;

$r_i$ is the distance between the sample point i and the vertex; and

A is the area of the source surface;

e) determining radiosity at each vertex based upon the form factors determined in step (d) for each vertex;

f) repeating steps (c)–(e) a selected number of times, each successive time the light source being redefined to be another source of irradiated light in the scene that provides the greatest energy output in the scene when the previously defined light source is disregarded, thereby obtaining a plurality of radiosities collectively indicating global illumination of the scene; and g) controlling the computer graphics display device to display the three dimensional image of the scene based upon the radiosities determined from step (f), at least one of the light sources being defined according to the relationship:

$$F = [\cos\theta_v (\cos\theta_s)^n]/[a_1 + a_2 r + a_3 r^2]$$

where:

F = the form factor;

$\theta_v$ = the angle between a surface normal at a vertex and a ray cast from the vertex to a point on the light source;

$\theta_s$ = the angle between a surface normal at the point on the light source and a ray cast from the vertex to the point on the light source;

n = a distribution characteristic of the light source;

r = the distance between the light source and a vertex; and $a_1$, $a_2$ and $a_3$ = constants representing attenuation behavior of irradiated light.

* * * * *